(12) United States Patent
Hill

(10) Patent No.: US 6,819,434 B2
(45) Date of Patent: *Nov. 16, 2004

(54) MULTI-AXIS INTERFEROMETER

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/351,708

(22) Filed: Jan. 27, 2003

(65) Prior Publication Data
US 2003/0218757 A1 Nov. 27, 2003

Related U.S. Application Data

(60) Provisional application No. 60/352,341, filed on Jan. 28, 2002, and provisional application No. 60/352,425, filed on Jan. 28, 2002.

(51) Int. Cl.[7] .............................................. G01B 9/02
(52) U.S. Cl. ..................... 356/509; 356/500; 356/493
(58) Field of Search ................................ 356/498, 500, 356/508, 510, 493, 487

(56) References Cited

U.S. PATENT DOCUMENTS

| | | | |
|---|---|---|---|
| 4,784,490 A | 11/1988 | Wayne | ........................ 356/351 |
| 4,859,066 A | 8/1989 | Sommargren | |
| 4,881,815 A | 11/1989 | Sommargren | ............... 356/349 |
| 4,881,816 A | 11/1989 | Zanoni | |
| 4,883,357 A * | 11/1989 | Zanoni et al. | ............... 356/487 |
| 5,064,289 A | 11/1991 | Bockman | |
| 5,483,343 A | 1/1996 | Iwamoto et al. | ............. 356/351 |
| 5,757,160 A | 5/1998 | Kreuzer | ....................... 318/649 |
| 5,801,832 A | 9/1998 | Van Den Brink | |
| 6,020,964 A | 2/2000 | Loopstra et al. | ............. 356/358 |
| 6,046,792 A | 4/2000 | Van Der Werf et al. | |
| 6,271,923 B1 | 8/2001 | Hill | |
| 6,313,918 B1 * | 11/2001 | Hill et al. | .................... 356/498 |
| 6,552,804 B2 * | 4/2003 | Hill | .............................. 356/510 |
| 2002/0001087 A1 | 1/2002 | Hill | .............................. 356/510 |

* cited by examiner

Primary Examiner—Samuel A. Turner
Assistant Examiner—Patrick Connolly
(74) Attorney, Agent, or Firm—Fish & Richardson P.C.

(57) ABSTRACT

An apparatus includes a multi-axis interferometer for measuring changes in a position of a measurement object. The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, wherein each angle-measuring beam makes only a single pass to the measurement object before being combined to form the angle-measuring output beam. The interferometer is further configured to direct another set of beams derived from the progenitor input beam along different paths and then combine them to produce another output beam comprising information about changes in the position of the measurement object.

62 Claims, 32 Drawing Sheets

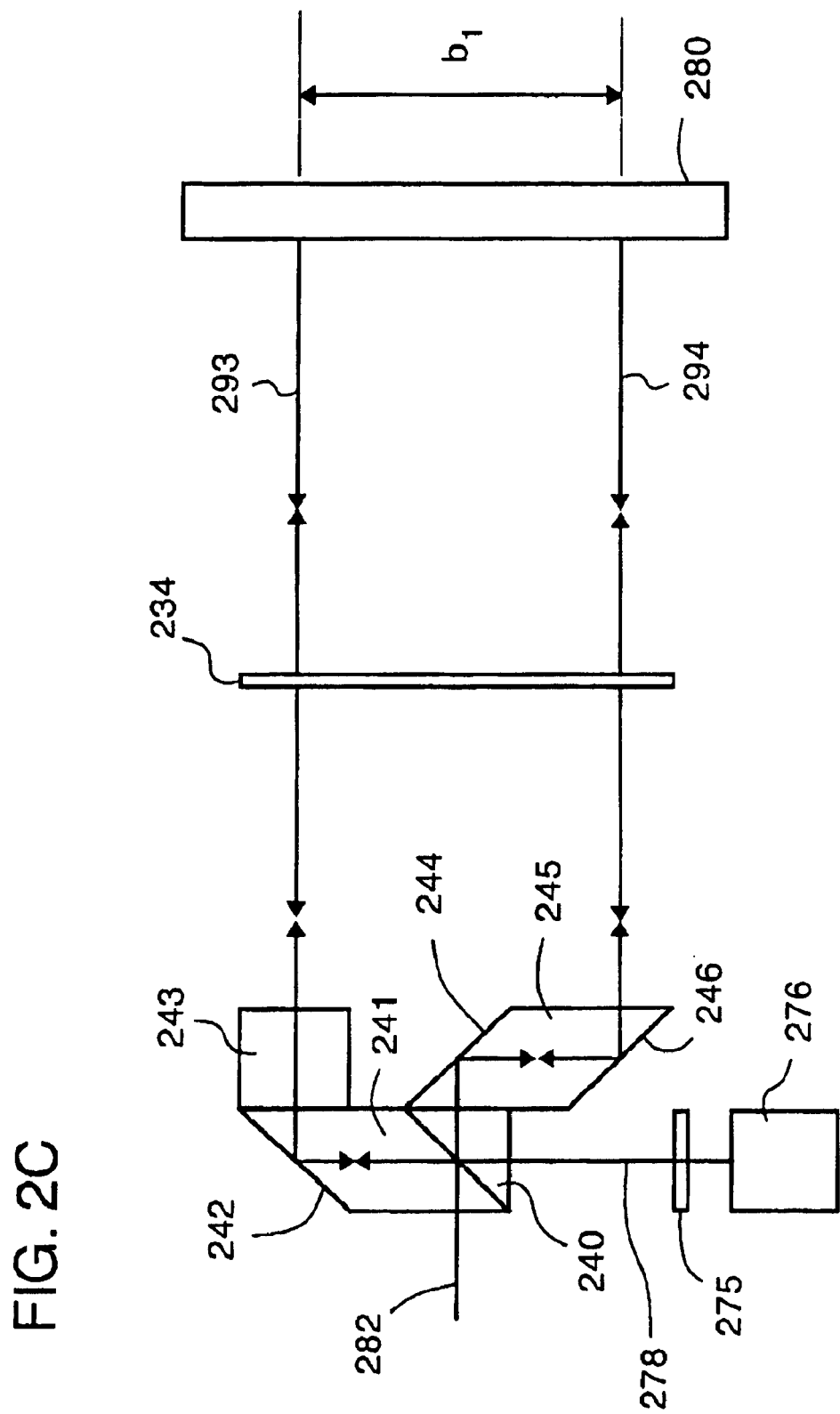

MULTI-AXIS INTERFEROMETER

CROSS-REFERENCE TO RELATED APPLICATIONS

This application claims priority to the following U.S. Provisional Patent Applications: U.S. Ser. No. 60/352,341 by Henry A. Hill entitled "MULTIPLE-DEGREES OF FREEDOM MEASURING PLANE MIRROR INTERFEROMETER ASSEMBLY" and filed 28 Jan. 2002 (Z-391); and U.S. Ser. No. 60/352,425 by Henry A. Hill entitled "REDUCED DIFFERENTIAL BEAM SHEAR MULTIPLE-DEGREES OF FREEDOM INTERFEROMETERS" filed 28 Jan. 2002. Each of the above-referenced Provisional Patent Applications are incorporated herein by reference.

TECHNICAL FIELD

This invention relates to interferometers, e.g., displacement measuring and dispersion interferometers that measure angular and linear displacements of a measurement object such as a mask stage or wafer stage in a lithography scanner or stepper system.

BACKGROUND

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2 vnp/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change $L$ of $\lambda/(np)$, where $L$ is a round-trip distance change, e.g., the change in distance to and from a stage that includes the measurement object.

Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors." The cyclic errors can be expressed as contributions to the phase and/or the intensity of the measured interference signal and have a sinusoidal dependence on the change in optical path length $pnL$. In particular, the first harmonic cyclic error in phase has a sinusoidal dependence on $(2\pi pnL)/\lambda$ and the second harmonic cyclic error in phase has a sinusoidal dependence on $2(2\pi pnL)/\lambda$. Higher harmonic cyclic errors can also be present.

There are also "non-cyclic non-linearities" such as those caused by a change in lateral displacement (i.e., "beam shear") between the reference and measurement beam components of an output beam of an interferometer when the wavefronts of the reference and measurement beam components have wavefront errors. This can be explained as follows.

Inhomogeneities in the interferometer optics may cause wavefront errors in the reference and measurement beams. When the reference and measurement beams propagate collinearly with one another through such inhomogeneities, the resulting wavefront errors are identical and their contributions to the interferometric signal cancel each other out. More typically, however, the reference and measurement beam components of the output beam are laterally displaced from one another, i.e., they have a relative beam shear. Such beam shear causes the wavefront errors to contribute an error to the interferometric signal derived from the output beam.

Moreover, in many interferometry systems beam shear changes as the position or angular orientation of the measurement object changes. For example, a change in relative beam shear can be introduced by a change in the angular orientation of a plane mirror measurement object. Accordingly, a change in the angular orientation of the measurement object produces a corresponding error in the interferometric signal.

The effect of the beam shear and wavefront errors will depend upon procedures used to mix components of the output beam with respect to component polarization states and to detect the mixed output beam to generate an electrical interference signal. The mixed output beam may for example be detected by a detector without any focusing of the mixed beam onto the detector, by detecting the mixed output beam as a beam focused onto a detector, or by launching the mixed output beam into a single mode or multi-mode optical fiber and detecting a portion of the mixed output beam that is transmitted by the optical fiber. The effect of the beam shear and wavefront errors will also depend on properties of a beam stop should a beam stop be used in the procedure to detect the mixed output beam. Generally, the errors in the interferometric signal are compounded when an optical fiber is used to transmit the mixed output beam to the detector.

Amplitude variability of the measured interference signal can be the net result of a number of mechanisms. One mechanism is a relative beam shear of the reference and measurement components of the output beam that is for example a consequence of a change in orientation of the measurement object.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used in converting the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged.

The interferometers described above are often crucial components of scanner systems and stepper systems used in lithography to produce integrated circuits on semiconductor wafers. Such lithography systems typically include a translatable stage to support and fix the wafer, focusing optics used to direct a radiation beam onto the wafer, a scanner or stepper system for translating the stage relative to the exposure beam, and one or more interferometers. Each interferometer directs a measurement beam to, and receives a reflected measurement beam from, a plane mirror attached to the stage. Each interferometer interferes its reflected measurement beams with a corresponding reference beam, and collectively the interferometers accurately measure changes in the position of the stage relative to the radiation beam. The interferometers enable the lithography system to precisely control which regions of the wafer are exposed to the radiation beam.

In many lithography systems and other applications, the measurement object includes one or more plane mirrors to reflect the measurement beam from each interferometer. Small changes in the angular orientation of the measurement object, e.g., pitch and yaw of a stage, can alter the direction of each measurement beam reflected from the plane mirrors. If left uncompensated, the altered measurement beams reduce the overlap of the exit measurement and reference beams in each corresponding interferometer. Furthermore, these exit measurement and reference beams will not be propagating parallel to one another nor will their wave fronts be aligned when forming the mixed beam. As a result, the interference between the exit measurement and reference beams will vary across the transverse profile of the mixed beam, thereby corrupting the interference information encoded in the optical intensity measured by the detector.

To address this problem, many conventional interferometers include a retroreflector that redirects the measurement beam back to the plane mirror so that the measurement beam "double passes" the path between the interferometer and the measurement object. The presence of the retroreflector insures that the direction of the exit measurement is insensitive to changes in the angular orientation of the measurement object. However, even with the retroreflector, the lateral position of the exit measurement beam remains sensitive to changes in the angular orientation of the measurement object. Furthermore, the path of the measurement beam through optics within the interferometer also remains sensitive to changes in the angular orientation of the measurement object.

In practice, the interferometry systems are used to measure the position of the wafer stage along multiple measurement axes. For example, defining a Cartesian coordinate system in which the wafer stage lies in the x-y plane, measurements are typically made of the x and y positions of the stage as well as the angular orientation of the stage with respect to the z axis, as the wafer stage is translated along the x-y plane. Furthermore, it may be desirable to also monitor tilts of the wafer stage out of the x-y plane. For example, accurate characterization of such tilts may be necessary to calculate Abbe offset errors in the x and y positions. Thus, depending on the desired application, there may be up to five degrees of freedom to be measured. Moreover, in some applications, it is desirable to also monitor the position of the stage with respect to the z-axis, resulting in a sixth degree of freedom.

To measure each degree of freedom, an interferometer is used to monitor distance changes along a corresponding metrology axis. For example, in systems that measure the x and y positions of the stage as well as the angular orientation of the stage with respect to the x, y, and z axes, at least three spatially separated measurement beams reflect from one side of the wafer stage and at least two spatially separated measurement beams reflect from another side of the wafer stage. See, e.g., U.S. Pat. No. 5,801,832 entitled "Method of and Device for Repetitively Imaging a Mask Pattern on a Substrate Using Five Measuring Axes," the contents of which are incorporated herein by reference. Each measurement beam is recombined with a reference beam to monitor optical path length changes along the corresponding metrology axes. Because the different measurement beams contact the wafer stage at different locations, the angular orientation of the wafer stage can then be derived from appropriate combinations of the optical path length measurements. Accordingly, for each degree of freedom to be monitored, the system includes at least one measurement beam that contacts the wafer stage. Furthermore, as described above, each measurement beam may double-pass the wafer stage to prevent changes in the angular orientation of the wafer stage from corrupting the interferometric signal. The measurement beams may generated from physically separate interferometers or from multi-axes interferometers that generate multiple measurement beams.

SUMMARY

The invention features multiple-degrees of freedom measuring interferometer assemblies and methods for measuring two, three and/or more degrees of freedom using a single interferometer optical assembly. For example, a two-degrees of freedom measuring plane mirror interferometer assembly may be configured to measure both a linear displacement and an angular displacement or two orthogonal angular displacements of a plane mirror. Furthermore, a three-degrees of freedom measuring plane mirror interferometer assembly may be configured to measure a linear displacement and two orthogonal angular displacements of a plane mirror or to measure two linear displacements and one angular displacement. Moreover, four or more degrees of freedom measuring plane mirror interferometer assembly may be configured to measure other combinations of linear and angular displacements.

In many embodiments, the interferometer directs a first set of two "angle-measuring" beams derived from a common input beam to contact a measurement object (e.g., a plane mirror measurement object) at two different locations and then combines the angle-measuring beams to produce a corresponding angle-measuring output beam. Because of optical differencing between the two angle-measuring beams, the angle-measuring output beam includes information about the changes in the angular orientation of the measurement object. Furthermore, in many embodiments, each of the angle-measuring beams contacts the measurement object only once, which tends to reduce sources of cyclic error non-linearities in the output signal.

The interferometer further directs one or more additional sets of beams along respective paths to produce one or more additional output beams that include information changes in the position or orientation of the measurement object with respect to additional degree(s) of freedom. For example, the interferometer may include a high stability plane mirror interferometer (HSPMI) portion for measuring changes in distance to the measurement object.

Embodiments of the interferometer may further include configurations that reduce or even eliminate differential beam shear between components of the angle-measuring output beam(s) at a detector or optical fiber pickup for coupling beams to the detector.

To measure multiple degrees of freedom, embodiments of the interferometer separate an input beam (or a progenitor input beam) into multiple sets of beams. In a first set of embodiments, the interferometer separates the progenitor input beam into two or more subsequent input beams (e.g., an angle-measuring input beam and a distance-measuring input beam) prior to any contact with the measurement object. In another set of embodiments, the interferometer separates an intermediate beam into multiple beams corresponding to the different degrees of freedom, where the intermediate beam includes a component (e.g., a "primary" measurement beam) that contacts the measurement beam at least once. In such embodiments, two or more of the output beams include a component that contacts the measurement object along a common path (e.g., the path defined by the primary measurement beam). Furthermore, in yet another set of embodiments, the interferometer separates a part of an output beam (e.g., an angle-measuring output beam) to define an additional input beam which is redirected back into the interferometer to measure an additional degree of freedom.

Typically, the interferometer assemblies are configured so that the beams that correspond to the different components in the output beams have optical path lengths of equal lengths in glass and/or equal lengths in a gas.

We now summarize different aspects and features of the invention.

In general, in one aspect, the invention features an apparatus including a multi-axis interferometer for measuring changes in a position of a measurement object (e.g., a plane mirror). The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam. Each angle-measuring beam makes only a single pass to the measurement object before being combined to form the angle-measuring output beam. The interferometer is further configured to direct another set of beams derived from the progenitor input beam along different paths and then combine them to produce another output beam including information about changes in the position of the measurement object.

Embodiments of the apparatus may include any of the following features.

The other set of beams may include a first distance-measuring beam and a second distance-measuring beam and the other output beam may be a distance-measuring output beam. In such embodiments, the interferometer directs the first distance-measuring beam to make first and second passes to the measurement object and then combines it with the second distance-measuring beam to produce the distance-measuring output beam.

The interferometer may include a non-polarizing beam-splitter positioned to receive the progenitor input beam and separate it into an angle-measuring input beam and a distance-measuring input beam, wherein the first and second angle-measuring beams are derived from the angle-measuring input beam and the first and second distance-measuring beams are derived from the distance-measuring input beam. For example, the interferometer may include an angle-measuring optical assembly configured to direct the angle-measuring beams to the measurement object and a distance-measuring optical assembly configured to direct the distance measuring beams, wherein the angle-measuring optical assembly and distance-measuring optical assembly each include separate polarizing beam-splitters. The distance-measuring optical assembly may be configured as a high-stability plane mirror interferometer (HSPMI).

The interferometer may be configured to overlap the first angle-measuring beam with the first distance-measuring beam during their first pass to the measurement object. For example, the interferometer may include a non-polarizing beam-splitter positioned to separate the first angle-measuring beam from the first distance-measuring beam after their first pass to the measurement object.

The interferometer may include a non-polarizing beam-splitter positioned to receive the angle-measuring output beam and separate a portion of it to define a distance-measuring input beam, wherein the distance-measuring beams are derived from the distance-measuring input beam. Furthermore, in such embodiments, the interferometer may further include output fold optics positioned to direct the distance-measuring input beam, where the output fold optics include an a focal system having a magnification selected to cause the first distance-measuring beam to contact the measurement object at substantially normal incidence for a range of angular orientations of the measurement object. For example, the magnification may be 2:1.

The interferometer may be further configured to direct the first angle-measuring beam to make a pass to a reflective reference object after making the pass to the measurement object and before being combined with the second angle-measuring beam, and direct the second angle-measuring beam to make a pass to the reference object before making the pass to the measurement object. Moreover, the interferometer may be further configured to direct the second distance-measuring beam to make first and second passes to the reference object (e.g., a plane mirror).

The interferometer may include: a polarizing beam-splitter positioned to transmit one of each of the angle-measuring beams and the distance-measuring beams and reflect the other of each of the angle-measuring beams and the distance-measuring beams during each of the passes to the measurement and reference objects, and further positioned to recombine the angle-measuring beams to form the angle-measuring output beam and recombine the distance-measuring beams to form the distance-measuring output beam after the first and second passes; and a return optical assembly positioned to receive the angle-measuring and distance-measuring beams from the polarizing beam-splitter and redirect them back to the polarizing beam splitter between the first and second passes. The interferometer may include the reference object, or the reference object may be part of another measurement object such as in a differential plane mirror interferometer (DPMI). The interferometer may further includes a quarter-wave retarder positioned between the polarizing beam-splitter and the reference object and a quarter-wave retarder positioned between the polarizing beam-splitter and the measurement object.

The return optical assembly may include a half-wave retarder positioned to rotate the polarizations of the angle-measuring beams between the first and second passes. It may further includes an odd number of reflective surfaces positioned for the redirecting of the angle-measuring beams back to the polarizing beam-splitter. The odd number of reflective surfaces may each include a normal in a common plane. Moreover, the odd number of reflective surfaces may reflect the angle-measuring beams such that a sum of angles between incident and reflected beams at each of the reflective surfaces is zero or an integer multiple of 360 degrees, each angle measured in a direction from the incident beam to the reflected beam and having a positive value when measured in a counter clockwise direction and a negative value when measured in a clockwise direction. The return beam assembly may further include a retroreflector positioned for the redirecting of the distance-measuring beams back to the polarizing beam-splitter.

More generally, the return optical assembly may include a set of reflective surfaces positioned for the redirecting of the angle-measuring beams back to the polarizing beam-splitter, wherein the set of reflective surfaces reflect the angle-measuring beams such that a sum of angles between incident and reflected beams at each of the reflective surfaces is zero or an integer multiple of 360 degrees, each angle measured in a direction from the incident beam to the reflected beam and having a positive value when measured in a counter clockwise direction and a negative value when measured in a clockwise direction.

The interferometer may further include a non-polarizing beam-splitter positioned to receive the progenitor input beam and separate it into an angle-measuring input beam and a distance-measuring input beam, and wherein the polarizing beam-splitter is positioned to separate the angle-measuring input beam into the first and second angle-measuring beams and separate the distance-measuring input beam into the first and second distance-measuring beams.

The interferometer may be configured to direct the first angle-measuring beam to overlap with the first distance-measuring beam during their first pass to the measurement object and direct the second angle-measuring beam to overlap with the second distance-measuring beam during their first pass to the reference object. For example, the polarizing beam-splitter may be positioned to separate the progenitor input beam into a pair of overlapping beams including the first angle-measuring beam and the first distance-measuring beam and a pair of overlapping beams including the second angle-measuring beam and the second distance-measuring beam, and wherein the polarizing beam-splitter is further positioned to recombine the pairs of beams after their respective first passes to the measurement and reference objects to define an intermediate beam. Moreover, the return optical assembly may be positioned to receive the intermediate beam and include a non-polarizing beam-splitter positioned to separate spatially the angle-measuring beams from the distance-measuring beams.

The interferometer may include output fold optics including a non-polarizing beam-splitter positioned to receive the angle-measuring output beam and separate a portion of it to define a distance-measuring input beam, wherein the output fold optics are configured to direct the distance-measuring input beam to the polarizing beam-splitter, and wherein the polarizing beam-splitter is positioned to separate the distance-measuring input beam into the distance-measuring beams. Furthermore, the output fold optics may include an afocal system having a magnification selected to cause the first distance-measuring beam to contact the measurement object at substantially normal incidence for a range of angular orientations of the measurement object. For example, the magnification may be 2:1.

The apparatus may further include a light source configured to produce the progenitor input beam and direct it into the multi-axis interferometer, the progenitor input beam including two components having an heterodyne frequency splitting, wherein one of each of the angle-measuring beams and the other set of beams is derived from one of the components in the input beam, and the other of each of the angle-measuring beams and the other set of beams is derived from the other of the components in the input beam. For example, the components of the input beam may have orthogonal polarizations.

The apparatus may further include detectors configured to receive the output beams and generate electrical signals indicative of the changes in the angular orientation of, and the distance to, the measurement object. The apparatus may further include a polarization analyzer positioned prior to each detector and configured to pass an intermediate polarization to those of the components in each of the output beams. Furthermore, the apparatus may further include a fiber optic pick-up for coupling each output beam to a corresponding detector after it passes through the corresponding polarization analyzer.

The interferometer may further include an optical delay line positioned to reduce differential beam shear in the angle-measuring output beam. For example, the optical delay line may be positioned to introduce additional path length to the second angle-measuring beam during its return from the measurement object. In another example, the optical delay line may be configured to introduce a difference in path length between orthogonally polarized components of an incident beam. Moreover, the optical delay line may be positioned to receive the progenitor input beam and both of the output beams. In another example, the optical delay line may be positioned to receive the progenitor input beam and the distance-measuring output beam and the interferometer may include a second optical delay line positioned to receive the second the angle-measuring beam during its pass to the measurement object.

The interferometer may further include an optical delay block positioned to introduce additional path length to the second angle-measuring beam during its return from the measurement object to reduce differential beam shear in the angle-measuring output beam.

The first-mentioned angle-measuring output beam may include information about the angular orientation of the measurement object with respect to a first rotation axis. The interferometer may be further configured to direct a third angle-measuring beam derived from the progenitor input beam to make a pass to the measurement object, direct a fourth angle-measuring beam derived from the progenitor input beam to make a pass to the measurement object, and then combine the third and fourth angle-measuring beams to produce a second angle-measuring output beam including information about the angular orientation of the measurement object with respect to a second rotation axis different from the first rotation axis. For example, the second rotation axis may be orthogonal to the first rotation axis. The interferometer may be further configured to overlap the first and third angle-measuring beams during their pass to the measurement object.

In another aspect, the invention features a first apparatus including a multi-axis interferometer for measuring changes in an angular orientation of, and distance to, a measurement object. The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam. The interferometer is further configured to direct another set of beams derived from the progenitor input beam along different paths and then combine them to produce another output beam including information about changes in the position of the measurement object. The interferometer includes a non-polarizing beam-splitter positioned to receive the progenitor input beam and separate it into an angle-measuring input beam and another input beam, wherein the first and second angle-measuring beams are derived from the angle-measuring input beam and the other set of beams are derived from the other input beam.

Embodiments of the second apparatus may further include features described above in connection with the first-mentioned apparatus.

In general, in another aspect, the invention features a third apparatus including a multi-axis interferometer for measuring changes in a position of a measurement object. The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam. The interferometer is further configured to direct another set of beams derived from the progenitor input beam along different paths and then combine them to produce another output beam including information about changes in the position of the measurement object. During operation the first angle-measuring beam overlaps with a first one of the other set of beams during its first pass to the measurement object.

Embodiments of the third apparatus may further include features described above in connection with the first-mentioned apparatus.

In general, in another aspect, the invention features a fourth apparatus including a multi-axis interferometer for measuring changes in a position of a measurement object. The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam. The interferometer is further configured to direct a first distance-measuring beam derived from the progenitor input beam to make first and second passes to the measurement object and then combine the first distance-measuring beam with a second-distance measuring beam derived from the progenitor input beam to produce a distance-measuring output beam. The interferometer includes a non-polarizing beam-splitter positioned to receive the angle-measuring output beam and separate a portion of it to define a distance-measuring input beam, wherein the distance-measuring beams are derived from the distance-measuring input beam. In some embodiments, the interferometer further includes fold optics positioned to direct the distance-measuring input beam, the fold optics including an afocal system having a magnification selected to cause the first distance-measuring beam portion to contact the measurement object at substantially normal incidence for a range of angular orientations of the measurement object.

Embodiments of the fourth apparatus may further include features described above in connection with the first-mentioned apparatus.

In general, in another aspect, the invention features a fifth apparatus including a multi-axis interferometer for measuring changes in a position of a measurement object. The interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam. The interferometer is further configured to direct another set of beams derived from the progenitor input beam along different paths and then combine them to produce another output beam including information about changes in the position of the measurement object. The interferometer includes a polarizing beam-splitter positioned to combine the first angle-measuring beam with the second angle-measuring beam after the first angle-measuring beam makes its pass to the measurement object but before the second angle-measuring beam makes its pass to the measurement object, the combined beams defining an intermediate beam. The interferometer further includes a return optical assembly positioned to receive the intermediate beam and direct it back to the polarizing beam-splitter, the return optical assembly includes a set of reflective surfaces positioned to reflect the intermediate beam an odd number of times in a plane defined by the incidence of the angle-measuring beams on the measurement object, and wherein the return optical assembly further include a half-wave plate configured rotate the polarization of each angle-measuring beam in the intermediate beam.

Embodiments of the fifth apparatus may further include features described above in connection with the first-mentioned apparatus.

In general, in another aspect, the invention features a method including: directing a first angle-measuring changes in a position of a measurement object; directing a second angle-measuring beam derived from the progenitor input beam to make a pass to a second point on the measurement object; combining the angle-measuring beams after their passes to the measurement object to produce an angle-measuring output beam; directing another set of beams derived from the progenitor input beam along different paths; and combining the other set of beams to produce another output beam including information about changes in the position of the measurement object. In preferred embodiments, wherein each angle-measuring beam makes only a single pass to the measurement object.

The method may further include additional features corresponding to any of the features described above in connection with the different apparatus.

In another aspect, the invention features a lithography system for use in fabricating integrated circuits on a wafer. The lithography system includes: a stage for supporting the wafer; an illumination system for imaging spatially patterned radiation onto the wafer; a positioning system for adjusting the position of the stage relative to the imaged radiation; and any of the interferometric apparatus described above for monitoring the position of the wafer relative to the imaged radiation.

In another aspect, the invention features another lithography system for use in fabricating integrated circuits on a wafer. This lithography system includes: a stage for supporting the wafer; and an illumination system including a radiation source, a mask, a positioning system, a lens assembly, and any of the interferometric apparatus described above. During operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask. The beam writing system includes: a source providing a write beam to pattern a substrate; a stage supporting the substrate; a beam directing assembly for delivering the write beam to the substrate; a positioning system for positioning the stage and beam directing assembly relative one another; and any of the interferometric apparatus described above for monitoring the position of the stage relative to the beam directing assembly.

In another aspect, the invention features a lithography method for use in fabricating integrated circuits on a wafer. The lithography method includes: supporting the wafer on a moveable stage; imaging spatially patterned radiation onto the wafer; adjusting the position of the stage; and monitoring the position of the stage using any of the interferometric methods described above.

In another aspect, the invention features another lithography method for use in the fabrication of integrated circuits. This lithography method includes: directing input radiation through a mask to produce spatially patterned radiation; positioning the mask relative to the input radiation; monitoring the position of the mask relative to the input radiation using any of the interferometry methods described above; and imaging the spatially patterned radiation onto a wafer.

In another aspect, the invention features a third lithography method for fabricating integrated circuits on a wafer including: positioning a first component of a lithography system relative to a second component of a lithography system to expose the wafer to spatially patterned radiation; and monitoring the position of the first component relative to the second component using any of the interferometric methods described above.

In another aspect, the invention features a method for fabricating integrated circuits, the method including any of the lithography methods described above.

In another aspect, the invention features a method for fabricating integrated circuits, the method including using any of the lithography systems described above.

In another aspect, the invention features a method for fabricating a lithography mask, the method including: directing a write beam to a substrate to pattern the substrate; positioning the substrate relative to the write beam; and monitoring the position of the substrate relative to the write beam using any of the interferometry methods described above.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2c is a plan view of another portion of the first embodiment of the interferometric system;

FIG. 6b is a plan view of a variant of the embodiment of FIG. 6a;

FIG. 7b is a side view of the embodiment of FIG. 7a;

FIG. 7c is another side view of the embodiment of FIG. 7a;

FIG. 8b is a diagram depicting the arrangement of reference and measurement beam spots on the plane mirror measurement object in the embodiment of FIG. 8a;

FIG. 9b is a side view of a component of the embodiment of FIG. 9a;

FIG. 9c is a plan view of a second plane of the embodiment of FIG. 9a;

FIGS. 10b–10d show embodiments of an afocal system suitable for use in the embodiment of FIG. 10a;

FIG. 10e is a plan view of yet another embodiment of an interferometric system similar to that of FIG. 10a;

Like reference symbols in the various drawings indicate like elements.

DETAILED DESCRIPTION

Implementations of the present invention have interferometer assemblies that may comprise one or more linear displacement interferometers and one or more angular displacement interferometers. The linear displacement interferometers may comprise a double pass interferometer such as a high stability plane mirror interferometer (HSPMI) or a differential plane mirror interferometer (DPMI). The angular displacement interferometers include direct two beams to different points on a plane mirror measurement object and then combine the beams to form an angle-measuring output beam. Embodiments of the interferometer assemblies will be described wherein the interferometer assemblies comprise one or more linear displacement interferometers and one or more angular displacement interferometers.

Figure 1:
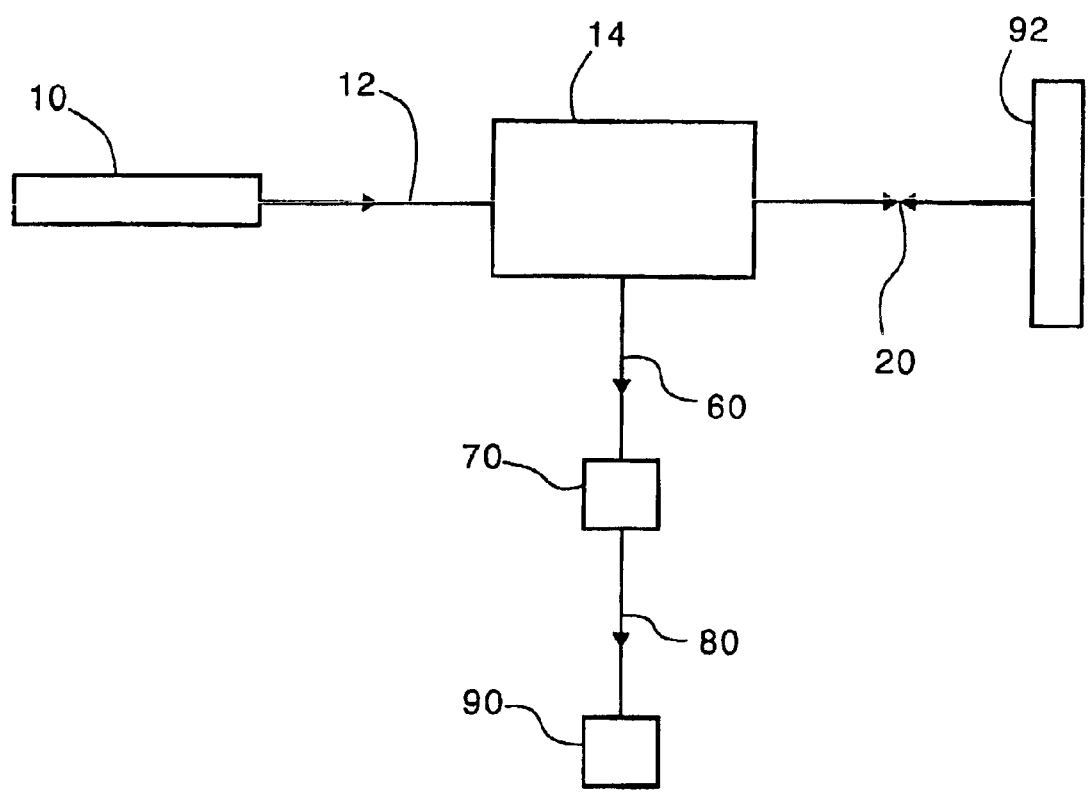
FIG. 1 is a schematic diagram of an interferometry system.

FIG. 1 is a diagrammatic view of an interferometer system by which linear and angular displacements of a plane mirror measurement object 92 are measured and monitored. As shown in FIG. 1, the interferometer system comprises source 10, interferometer 14 which may be structured and arranged as one of a number of interferometer types, detector 70, and electronic processor and computer 90 programmed in a well-known manner to perform data processing. With each type, as will be described in more detail hereinafter as separate embodiments, interferometer beams travel to and from mirror 92 generally along an optical path designated as 20 and output beams travel from interferometer 14 to detector 70 along optical path designated as 60. The output beams are detected by detector 70 to generate electrical interference signals that are transmitted to electronic processor and computer 90 as signal 80. Typically, a polarizer or polarization "analyzer" (not shown) is used to mix the polarizations of the measurement and reference beam components of the output beam prior to its detection by detector 70. Also in some embodiments, a fiber-optic pick-up (not shown) is used to couple the polarization-mixed output beam to a remote detector.

Input beam 12 is furnished by source 10 and is a two-component beam. The two components have different frequencies and are orthogonally plane polarized. The different frequencies can be produced in source 10, for example, by laser Zeeman splitting, by acousto-optical modulation, or internal to the laser using birefringent elements or the like.

Figure 2A:
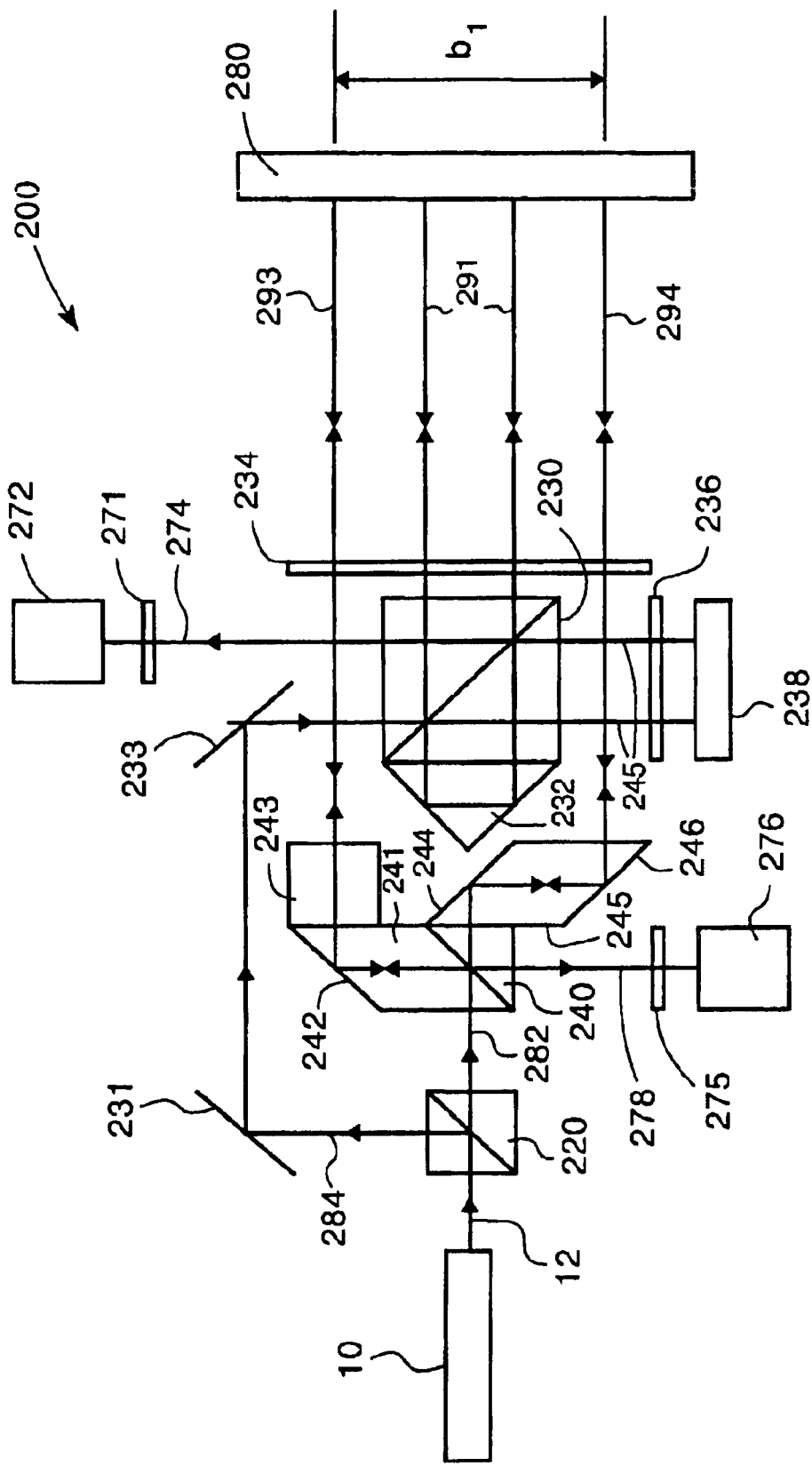
FIG. 2a is a plan view of a first embodiment of an interferometric system.

The first embodiment of interferometer 14 is shown in a perspective view in FIG. 2a and comprises two plane mirror interferometers in an integral optical assembly generally shown as numeral 114. Interferometer 114 will be described for operation as interferometer 14. The paths of measurement beams 122, 124, and 126 correspond to the path indicated by numeral 20 in FIG. 1. The two plane mirror interferometers have a common measurement beam path for one pass to plane mirror measurement object 92. The common measurement beam path corresponds to the path of measurement beam 122.

The following discussion refers to FIGS. 2a–2g. Referring to FIG. 2a, a first embodiment of the present invention includes an interferometer assembly 200 comprising a high stability plane mirror interferometer (HSPMI) and an angular displacement interferometer, wherein the interferometer assembly is configured to measure a linear displacement and an angular displacement of a plane mirror measurement object 280. Interferometer 200 will be described for operation as interferometer 14 of FIG. 1. The paths of beams 291, 293, and 294 correspond to the path indicated by numeral 20 in FIG. 1. The HSPMI is shown in schematic form in FIG. 2b and the angular displacement interferometer is shown in schematic form in FIG. 2c. While the apparatus has application for a wide range of radiation sources, the following description is taken by way of example with respect to an optical measuring system.

Referring to FIG. 2a, input beam 12 is emitted by source 10. Input beam 12 comprises two orthogonally polarized optical beam components having a difference in frequencies of $f_1$. The planes of polarization of the two orthogonally polarized components are parallel and orthogonal to the plane of FIG. 2a, respectively. A first portion of beam 12 is transmitted by a non-polarizing beam splitter 220 as an angle-measuring input beam 282 for the angular interferometer and a second portion of beam 12 is reflected by non-polarizing beam splitter 220 as a distance-measuring input beam 284 for the HSPMI. Although the first embodiment is described as a heterodyne system, the first embodiment can be configured for operation as a homodyne system without departing from the scope and spirit of the present invention.

Figure 2B:
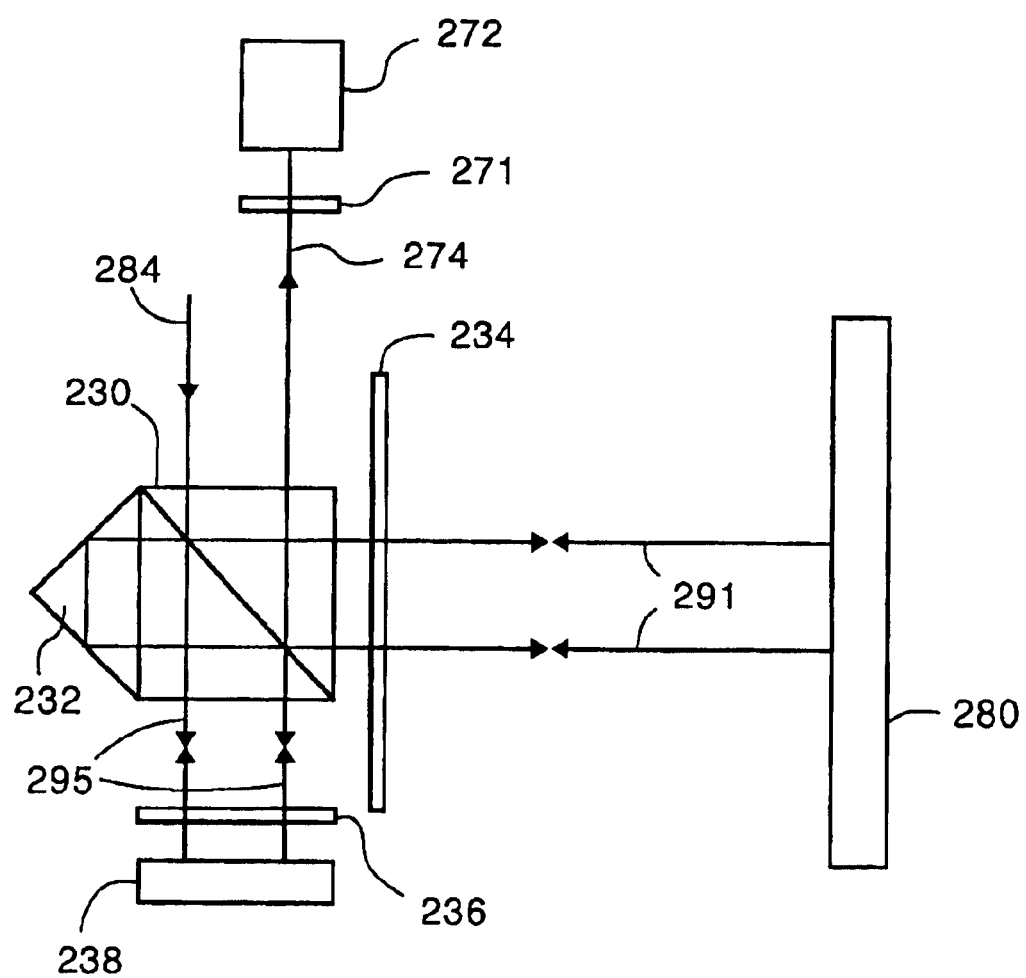
FIG. 2b is a plan view of a portion of the first embodiment of the interferometric system.

Referring to FIGS. 2a and 2b, the HSPMI includes a polarizing beam splitter 230, a retroreflector 232, two quarter wave plates 234 and 236, and a reference mirror 238. Mirrors 231 and 233 direct distance-measuring input beam 284 to polarizing beam-splitter 230, which splits it into a reference beam 295 and a measurement beam 291. Reference beam 295 reflects from reference mirror 238 and is then reflected by polarizing beam splitter 230 to retroreflector 232 following a double pass through quarter wave plate 236. Retroreflector 232 then directs reference beam 295 back to polarizing beam-splitter 230, which reflects it back to reference mirror 238, which in turn reflects it back to the polarizing beam-splitter after another double pass through quarter-wave plate 236. Because of the double pass through the quarter-wave plate, polarizing beam splitter 230 now transmits the reference beam as a reference beam component of a distance-measuring output beam 274. Measurement beam 291 reflects from measurement mirror 280 and is then transmitted by polarizing beam splitter 230 to retroreflector 232 following a double pass through quarter wave plate 234. Retroreflector 232 then directs measurement beam 291 back to polarizing beam-splitter 230, which transmits it back to measurement mirror 280, which in turn reflects it back to the polarizing beam-splitter after another double pass through quarter-wave plate 238. Because of the double pass through the quarter-wave plate, polarizing beam splitter 230 now reflects the measurement beam as a measurement beam component of a distance-measuring output beam 274.

Thus, following the double pass of measurement beam 291 to measurement object 280 and the double pass of reference beam 295 to reference object 238, polarizing beam-splitter 230 recombines measurement and reference beams 291 and 295, respectively, to form distance-measuring output beam 274. A polarizer 271 mixes the polarization components of the distance-measuring output beam before it impinges on detector 272. Reference beam 295 and measurement beam 291 may be thought of as two distance-measuring beams that are derived from distance-measuring input beam 284 and are ultimately recombined to produce distance-measuring output beam 274.

Referring to FIGS. 2a and 2c, the angular displacement interferometer includes a polarizing beam-splitter 240, rhomb 241 including reflective surface 242, optical block 243, and rhomb 245 including reflective surfaces 244 and 246. The angular displacement interferometer further includes quarter-wave plate 234, which was also part of the HSPMI. Polarizing beam-splitter 240 separates angle-measuring input beam 282 into angle-measuring beams 293 and 294. Angle-measuring beam 293 reflects from surface 242, passes through optical block 243, and then reflects from plane mirror measurement object 280. After double passing quarter-wave plate 234, angle-measuring beam 293 returns to polarizing beam-splitter 240, which transmits it as a first component of an angle-measuring output beam 278. Angle-measuring beam 294 reflects from surfaces 244 and 246, and then reflects from plane mirror measurement object 280. After double passing quarter-wave plate 234, angle-measuring beam 294 returns to polarizing beam-splitter 240, which reflects it as a second component of an angle-measuring output beam 278. Thus, polarizing beam splitter 240 recombines beams 293 and 294 after they each contact the plane mirror measurement object a single time at different points to form angle-measuring output beam 278. A polarizer 275 mixes the polarization components of the angle-measuring output beam before it impinges on detector 276.

The angular displacement interferometer introduces a relative phase shift $\phi_1$ between the components of the angle-measuring output beam for a change $\theta_1$ in the angular orientation of the plane mirror measurement object in the planes of FIGS. 2a and 2c. Relative phase shift $\phi_1$ and angular change $\theta_1$ are related according to the formula $$\phi_1 = k_1 n_1 b_1 \theta_1 \qquad (1)$$

where $b_1$ is the spacing between beams 293 and 294 at the plane mirror measurement object, wavenumber $k_1 = 2\pi/\lambda_1$ for wavelength $\lambda_1$ of the input beam 12, and $n_1$ is the index of refraction of a gas in the reference and measurement beam paths.

The angular displacement interferometer shown in FIGS. 2a and 2c is configured so that there is no relative beam shear between the beam components of the angle-measuring output beam at detector 276 or an optical fiber pickup (OFP). Also, the angular displacement interferometer shown in FIGS. 2a and 2c is configured so that the path lengths in glass are the same for the beams 293 and 294 so that the angular displacement interferometer is insensitive to changes in temperature that cause an index variation in the glass. The angular displacement interferometer is further configured so that the path lengths in the gas are the same for the corresponding beams.

Figure 2D:
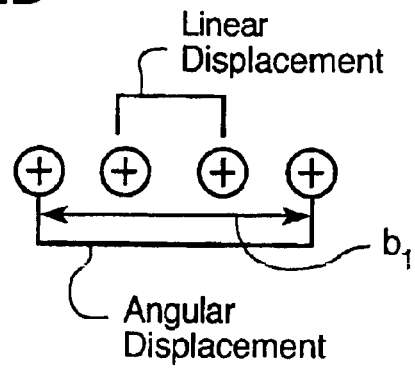
FIGS. 2d–2f are diagrams depicting the arrangement of beam spots on the plane mirror measurement object in variations of the first embodiment of the interferometric system.

The arrangement of the beam spots on the plane mirror measurement object is shown in FIG. 2d. The spots form a linear array with the measurement axis for the linear displacement interferometer coinciding with a line parallel to and centered between beams 293 and 294 of the angular displacement interferometer. However, the measurement axis for the linear displacement interferometer may be displaced from a line parallel to and centered between the beams of the angular displacement interferometer without departing from the scope and spirit of the present invention.

An advantage of the first embodiment is that there is no relative beam shear between the beam components of the output beam in the angular displacement interferometer and at a detector or optical fiber pickup. Also, the components of the angle-measuring output beam propagate parallel to one another even in the presence of tilt in the plane mirror measurement object. This is because each angle-measuring beam contacts the measurement object once, thus any angular deviation introduced by a tilt in the measurement object will effect both components, and hence the beam components remain parallel at the output of the angular displacement interferometer.

Another advantage of the first embodiment is that the beams used in the measurement of angular displacements make only single passes to the measurement object. The single pass configuration for the angular displacement interferometer has a reduced number of sources for generation of cyclic non-linearities as compared to the number of sources possible in a multi-pass interferometer configuration. However, it will be evident to those skilled in the art that the angular displacement interferometer may be configured so that the reference and measurement beams each make a multiple pass to the plane mirror measurement object without departing from the scope and spirit of the present invention.

Another advantage of the first embodiment is that the beam shears of the beams at the plane mirror measurement object are zero in the angular displacement interferometer.

Another advantage of the first embodiment is that the beams of the angular displacement interferometer have equal path lengths in glass and equal path lengths in a gas in the corresponding paths.

Another advantage of the first embodiment is that the measured phase $\phi_1$ of the angular displacement interferometer corresponding to $\theta_1 = 0$ is insensitive to changes in temperature of the angular displacement interferometer.

A first variant of the first embodiment is described wherein an interferometer assembly is configured to measure a linear displacement and an angular displacement of a single plane mirror object. The first variant of the first embodiment comprises the HSPMI and the angular displacement interferometer of the first embodiment except that the angular displacement interferometer of the first embodiment is rotated 90 degrees about a line parallel to beams 293 and 294 of the angular displacement interferometer that are incident on the plane mirror measurement object. The angular displacement that is measured is in a plane nominally orthogonal to the plane defined by the first and second pass measurement beams of the HSPMI.

Figure 2E:
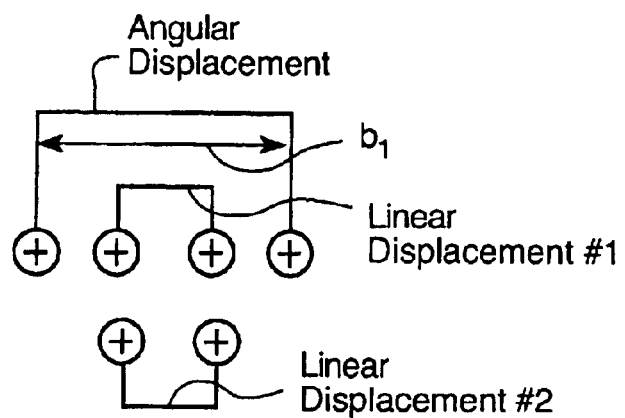

The arrangement of the beam spots on the single plane mirror for the first variant of the first embodiment is shown in FIG. 2e. The spots form an array with the measurement axis for the linear displacement interferometer coinciding with a line parallel to the beams of the angular displacement interferometer. The measurement axis for the linear displacement interferometer may be displaced from a line parallel to and centered between the reference and measurement beams of the angular displacement interferometer, e.g. as shown in FIG. 2e, without departing from the scope and spirit of the present invention.

The remaining description of the first variant of the first embodiment is the same as corresponding portions of the description given for the first embodiment.

A second variant of the first embodiment is described in which one angular displacement and two linear displacements are measured. The interferometer assembly of the second variant of the first embodiment comprises the interferometer assembly of the first embodiment and a second HSPMI. In FIG. 2a, the second HSPMI is located directly below the first HSPMI. The input beam to the second HSPMI is generated by splitting off a portion of beam 12 by a non-polarizing beam-splitter.

Figure 2F:
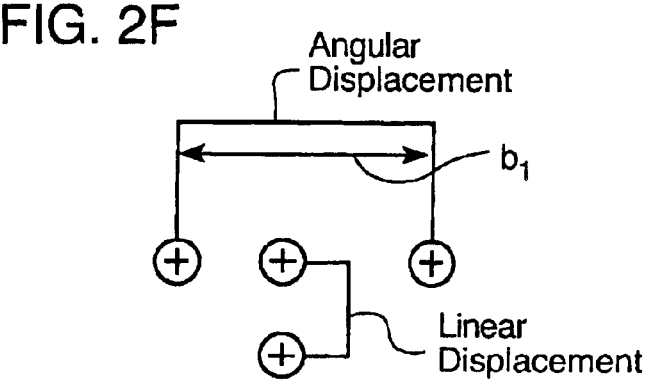

The arrangement of the beam spots on the single plane mirror for the second variant of the first embodiment is shown in FIG. 2f. The spots form an array with the measurement axes for the linear displacement interferometers coinciding with lines that are parallel to the beams of the angular displacement interferometer. Either or both measurement axes for the linear displacement interferometers may be displaced from the line parallel to and centered between the reference and measurement beams of the angular displacement interferometer without departing from the scope and spirit of the present invention.

The remaining description of the second variant of the first embodiment is the same as corresponding portions of the description given for the first embodiment.

As described above, the angular displacement interferometer of the first embodiment is substantially insensitive to temperature fluctuations because beams 293 and 294 each go through equal amounts of glass. In another variant of the first embodiment shown in FIG. 2g, a compensating optical assembly may be further included to minimize the effects of temperature gradients. For example, in the angular displacement interferometer of FIG. 2c, beam 293 passes through rhomb 241 and optical block 243, whereas beam 294 passes through rhomb 245. Although these elements provide equal amounts of glass to reduce the effect of temperature fluctuations, there may be still be differences in temperature between these various elements, i.e., temperature gradients, which can introduce an additional optical path length difference between the angle-measuring beams. The variant of FIG. 2g addresses this by directing the first angle measuring beam 293' to pass through rhomb 241 on its pass to plane mirror measurement object 280 and to pass through rhomb 245 on its way back from the plane mirror measurement object, and vice-versa for the second angle-measuring beam 294'.

Figure 2G:
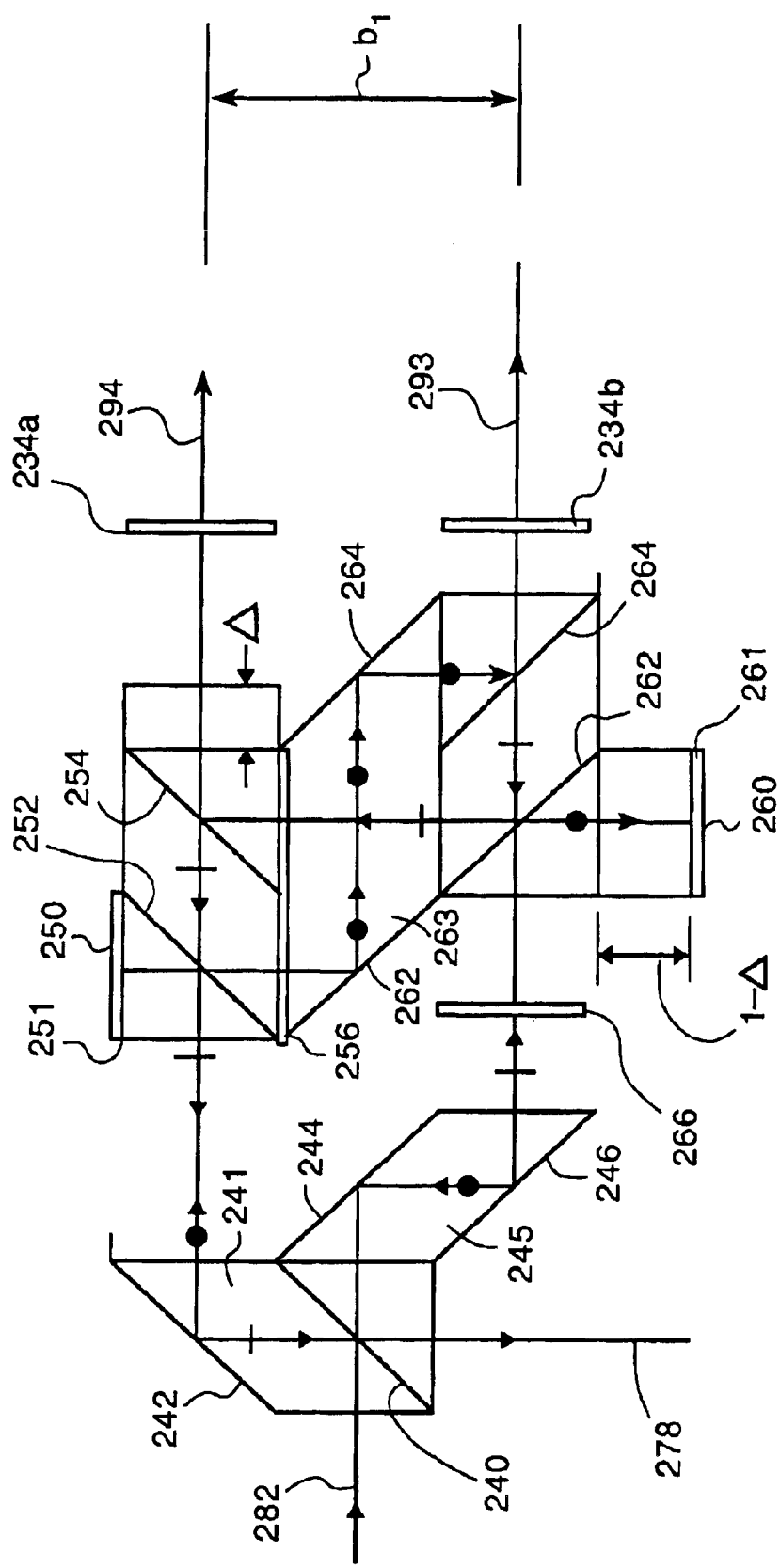
FIG. 2g is a plan view of a variation of a portion of the first embodiment of the interferometric system.

Referring still to FIG. 2g, the variant includes elements 240, 241, and 243, like those in the embodiment of FIG. 2c, to generate angle-measuring beams 293' and 294' from angle-measuring input beam 282. The variant further includes the following elements that comprise the compensating optical assembly: reflective interfaces 250 and 260, which include quarter-wave retarders 251 and 261, respectively, polarizing beam-splitters 252, 254, 262, and 264, reflective interfaces 262 and 264, and half-wave retardation plates 256 and 266. Furthermore, in the presently described variant, separate quarter-wave retardation plates 234a and 234b replace single quarter-wave plate 234 from FIG. 2c. Furthermore, in FIG. 2g beams designated with a dot after the direction arrow have a linear polarization normal to the plane of the figure, whereas beams designated with a line after the direction arrow have a linear polarization in the plane of the figure.

The beam paths in the variant will now be described. Beam 293' reflects from polarizing beam-splitter 252 and then reflects interface 250, double passing quarter wave retarder 251. This double pass causes polarizing beams-splitter 252 to then transmit beam 293', whereupon it reflects from interfaces 262 and 264 after having passes through half-wave retarder 256, which rotates its linear polarization by 90 degrees. Beam 293' is then incident on polarizing beam-splitter 264, which reflects it to plane mirror measurement object 280 (shown in FIG. 2c), which in turn reflects it back to polarizing beam-splitter 264 causing it to double-pass quarter wave retarder 234b. Because of this double pass, polarizing beam-splitter 264 transmits beam 293' to polarizing beam splitter 262, which likewise transmits beam 293', whereupon it is incident on half-wave retarder 266, which rotates its linear polarization by 90 degrees. Because of the polarization rotation, polarization beam splitter 240 reflects beam 293' (following reflections by interfaces 246 and 244) to form a first component of angle-measuring output beam 278.

On the other hand, beam 294' is transmitted by polarizing beam-splitter 252, reflects from interfaces 244 and 246, and then passes through half-wave retarder 266, which rotates its linear polarization by 90 degrees. Beam 294' is then reflected by polarizing beam-splitter 262, and then reflected back to polarizing beam-splitter 262 by reflective interface 260, thereby double passing quarter wave retarder 261. This double pass causes polarizing beams-splitter 262 to then transmit beam 294', whereupon it passes through half-wave retarder 256, which rotates its linear polarization by 90 degrees. Because of the polarization rotation, beam 294' then reflects from polarizing beam splitter 254 towards plane mirror measurement object 280 (shown in FIG. 2c), which in turn reflects it back to polarizing beam-splitter 254 causing it to double-pass quarter wave retarder 234a. Because of this double pass, polarizing beam-splitter 254 transmits beam 294' to polarizing beam splitter 252, which likewise transmits beam 294', whereupon it reflects from reflective interface 242, and then transmitted by polarizing beam-splitter 240 as a second component of angle-measuring output beam 278.

The compensating section reduces the sensitivity of the angular displacement interferometer to temperature gradients in the angular displacement interferometer while maintaining the insensitive of the angular displacement interferometer to changes in temperature of the angular displacement interferometer. The temperature gradient sensitivity of the variant of the angular displacement interferometer is approximately an order of magnitude lower than that of the angular displacement interferometer of the first embodiment with $\Delta \cong 0.3$ of the linear dimensions of a polarizing beam splitter cube. The additional path lengths in glass denoted by the relative dimensions, and 1-, are selected to cause the paths of beams 293' and 294' to have equal paths lengths in glass.

An advantage of the variant of FIG. 1g is that the beams 293' and 294' are partially coextensive and are counter propagating. The counter-propagating feature leads, for example, to improved reduction of sources of cyclic non-linearities.

Another advantage of the variant of the angular displacement interferometer is that the polarizing beam-splitters also serve as polarization filters that reduce the amplitudes of certain cyclic non-linearities.

Figure 3:
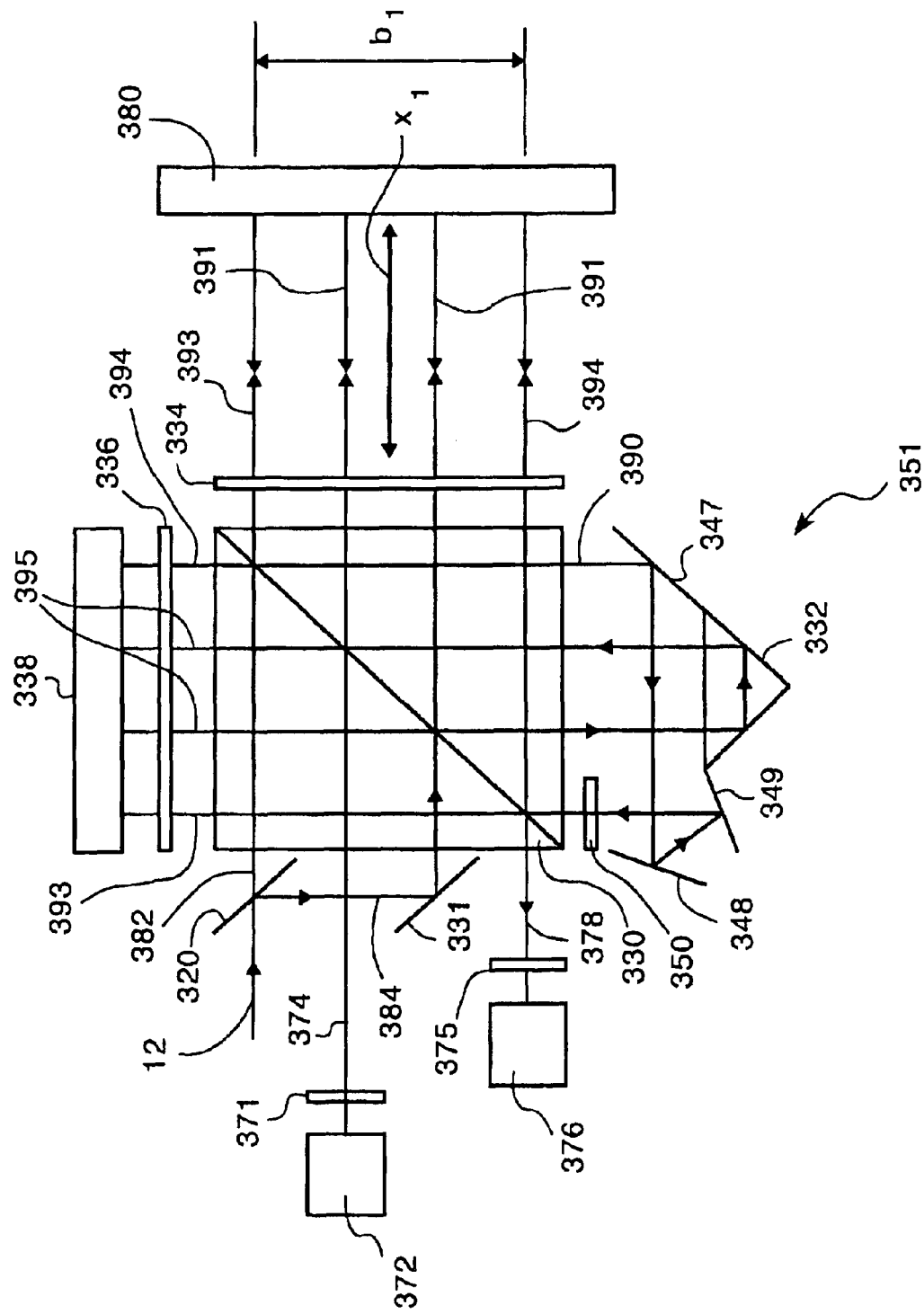
FIG. 3 is a plan view of a second embodiment of an interferometric system.

A second embodiment of the invention is shown in FIG. 3. The second embodiment is similar to the first embodiment in that a non-polarizing beam-splitter 320 splits progenitor input beam 12 into an angle-measuring input beam 382 and a distance-measuring input beam 384, and that the distance-measuring portion of the interferometer involves a high-stability plane mirror interferometer (HSPMI). Moreover, the angle-measuring portion of the second embodiment is like that of the first embodiment in that it directs angle-measuring beams to make single-passes to different points on the measurement object to produce an angle-measuring output beam based on optical differencing. As will be described in further detail below, the angle-measuring portion of the second embodiment also shares a number of components with the distance-measuring HSPMI portion of the second embodiment.

Referring still to FIG. 3, non-polarizing beam-splitter 320 reflects distance-measuring input beam 384 (via mirror 331) to polarizing beam-splitter 330, which splits it into two distance-measuring beams: a reflected reference beam 395 and a transmitted measurement beam 391. Reference beam 395 then reflects from reference mirror 338 and is then transmitted by polarizing beam splitter 330 to retroreflector 332 following a double pass through quarter wave plate 336. Retroreflector 332 then directs reference beam 395 back to polarizing beam-splitter 330, which transmits it back to reference mirror 338, which in turn reflects it back to the polarizing beam-splitter after another double pass through quarter-wave plate 336. Because of the double pass through the quarter-wave plate, polarizing beam splitter 330 now reflects the reference beam as a reference beam component of a distance-measuring output beam 374. Measurement beam 391 reflects from measurement mirror 380 and is then reflected by polarizing beam splitter 330 to retroreflector 332 following a double pass through quarter wave plate 334. Retroreflector 332 then directs measurement beam 391 back to polarizing beam-splitter 330, which reflects it back to measurement mirror 380, which in turn reflects it back to the polarizing beam-splitter after another double pass through quarter-wave plate 338. Because of the double pass through the quarter-wave plate, polarizing beam splitter 330 now transmits the measurement beam as a measurement beam component of a distance-measuring output beam 274.

Thus, following the double pass of measurement beam 391 to measurement object 380 and the double pass of reference beam 395 to reference object 338, polarizing beam-splitter 330 recombines measurement and reference beams 391 and 395, respectively, to form distance-measuring output beam 374. A polarizer 371 mixes the polarization components of the distance-measuring output beam before it impinges on detector 372. The phase of the distance-measuring output beam is derived from the measurement by detector 372 and used to determine linear displacements of the plane mirror object along a measurement axis $X_1$.

Non-polarizing beam-splitter 320 transmits angle-measuring input beam 382 to polarizing beam-splitter 330, which separates angle-measuring input beam 382 into angle-measuring beams 393 and 394. Polarizing beam-splitter 330 transmits angle-measuring beam 393, which then reflects plane mirror measurement object 380. After double passing quarter-wave plate 334, angle-measuring beam 393 returns to polarizing beam-splitter 330, which reflects it as a first component of an intermediate beam 390. Polarizing beam-splitter 330 reflects beam 394, which then reflects plane mirror reference object 338. After double passing quarter-wave plate 336, angle-measuring beam 394 returns to polarizing beam-splitter 330, which transmits it as a second component of an intermediate beam 390.

Intermediate beam 390 then makes three respective reflections from mirrors 347, 348, and 349, which direct the intermediate beam back to polarizing beam-splitter 330, which in turn separates the intermediate beam back into beams 393 and 394. Before reaching polarizing beam-splitter 330, however, intermediate beam 390 passes through half-wave retardation plate 350, which rotates the linear polarizations of the components of the intermediate beam by 90 degrees. Because of the polarization rotation, polarizing beam-splitter 330 subsequently reflects angle-measuring beam 394 to plane mirror measurement object 380 and transmits angle-measuring beam 393 to plane mirror reference object 338. Following reflections of beams 394 and 393 from the measurement and reference objects 380 and 338, respectively, and double-passes through quarter-wave plates 334 and 336, respectively, polarizing beam-splitter 330 recombines the angle-measuring beams as components of angle-measuring output beam 378. Accordingly, beams 393 and 394 are recombined to form angle-measuring output beam 378 after they each contact the plane mirror measurement object a single time at different points. A polarizer 375 mixes the polarization components of angle-measuring output beam 378 before it impinges on detector 376.

Components including retroreflector 332, mirrors 347, 348, and 349, and half-wave retardation plate 350 collectively define a return beam optical assembly 351 that returns distance-measuring beams 391 and 395 back to polarizing beam-splitter 330 between their first and second passes to the measurement and reference objects, respectively, and returns angle-measuring beams 393 and 394 back to polarizing beam-splitter 330 after their pass to the measurement and reference objects, respectively, and before their pass to the reference and measurement objects, respectively.

Because each angle-measuring beam contacts the measurement object once, any angular deviation introduced by a tilt in measurement object 380 will effect both components, and hence the beam components remain parallel at the output of the angular displacement interferometer.

As in the first embodiment, the angle-measuring output beam includes a relative phase shift $\phi_1$ that is related to an angular change of the measurement object, $\theta_1$, according to Eq. 1.

The return mirror system fold system including the three mirrors, 347, 348, and 349 for redirecting angle measuring beams 393 and 394 (when they are components of intermediate beam 390) back to polarizing beam splitter 330 ensures that both components in angle-measuring output beam 378 are parallel.

Moreover, another advantage of the second embodiment of the present invention is that the differential beam shear of the components of the angle-measuring output beam at a detector or fiber-optic pickup (FOP) is substantially reduced compared for example to the differential beam shear in the output beam at the detector or FOP of the HSPMI. This is because both components of the angle-measuring output beams (i.e., angle-measuring beams 393 and 394) undergo substantially equal amounts of shear upon a non-normal reflection from the measurement plane mirror and subsequent propagation back to the interferometer. On the other hand, one component propagates within the interferometer (i.e., to the reference object) before reflecting from the measurement object, and the other component propagates within the interferometer (i.e., to the reference object) after contacting reflecting from the measurement object, and thus there is additional uncompensated differential shear caused by the path length within the interferometer. The additional uncompensated differential shear shear is equal to $2\alpha_1 l_1/n_1'$ where $\alpha_1$ is a change in angular orientation of the plane mirror measurement object in the plane of FIG. 3, $l_1$ is the difference in physical lengths of the angle-measuring beams from the plane mirror measurement object to polarizing beam splitter 330 where they are combined to form the angle-measuring output beam, and $n_1'$ is the index of refraction of the glass in the interferometer. The length $l_1$ is independent of linear displacements of the plane mirror measurement object. Moreover, this path length difference is typically small relative to the path length between the interferometer and the measurement object. Furthermore, an optical delay line may be added to compensate for this additional differential shear as described in additional embodiments further below.

The angle-measuring portion of the interferometer is also configured so that the path lengths in glass are the same for the different output beam components, and so the angular displacement interferometer is substantially insensitive to changes in temperature. It is further configured so that the path lengths in the gas are the same for the different output beam components, so that it is substantially insensitive to environmental changes in the density of the gas in the corresponding beam paths.

Another advantage of the second embodiment is a reduced number of sources of cyclic errors in the measure phase of an electrical interference signal from the angular displacement interferometer. The number of sources of cyclic errors is reduced as a result of the angle-measuring beams making only a single pass to the plane mirror measurement object.

A third embodiment of the invention is shown in FIGS. 4a–4e. The third embodiment includes angle-measuring and distance-measuring portions very similar to those in the second embodiment. However, in the third embodiment, one of the angle-measuring beams overlaps with one of the distance measuring beams during a first pass to the measurement object, and the other of the angle-measuring beams overlaps with the other of the distance measuring beams during a first pass to the reference object. A non-polarizing beam-splitter in the return beam assembly subsequently separates spatially the angle-measuring beams from the distance-measuring beams so that spatially separated angle-measuring and distance-measuring output beams are ultimately produced. Because one of the angle-measuring beams overlaps with one of the distance-measuring beams during a first pass to the measurement object, each of the angle-measuring and distance-measuring output beams include a corresponding component that contacts the measurement object at least once along a common path.

Referring now to FIGS. 4a–e, a multi-axis interferometer is shown that includes a high-stability plane mirror interferometer (HSPMI) and an angular displacement interferometer. The HSPMI and angular displacement interferometer share some common optical components. The HSPMI is shown in schematic form in FIG. 4b and the angular displacement interferometer is shown in schematic form in FIG. 4c. The HSPMI produces a distance-measuring output beam 474 that includes information about changes in distance to a plane mirror measurement object 480 along a first measurement axis and the angular displacement interferometer produces an angle-measuring output beam 478 that includes information about changes in an angular orientation of the plane mirror measurement object with respect to a first rotation axis.

Figure 4A:
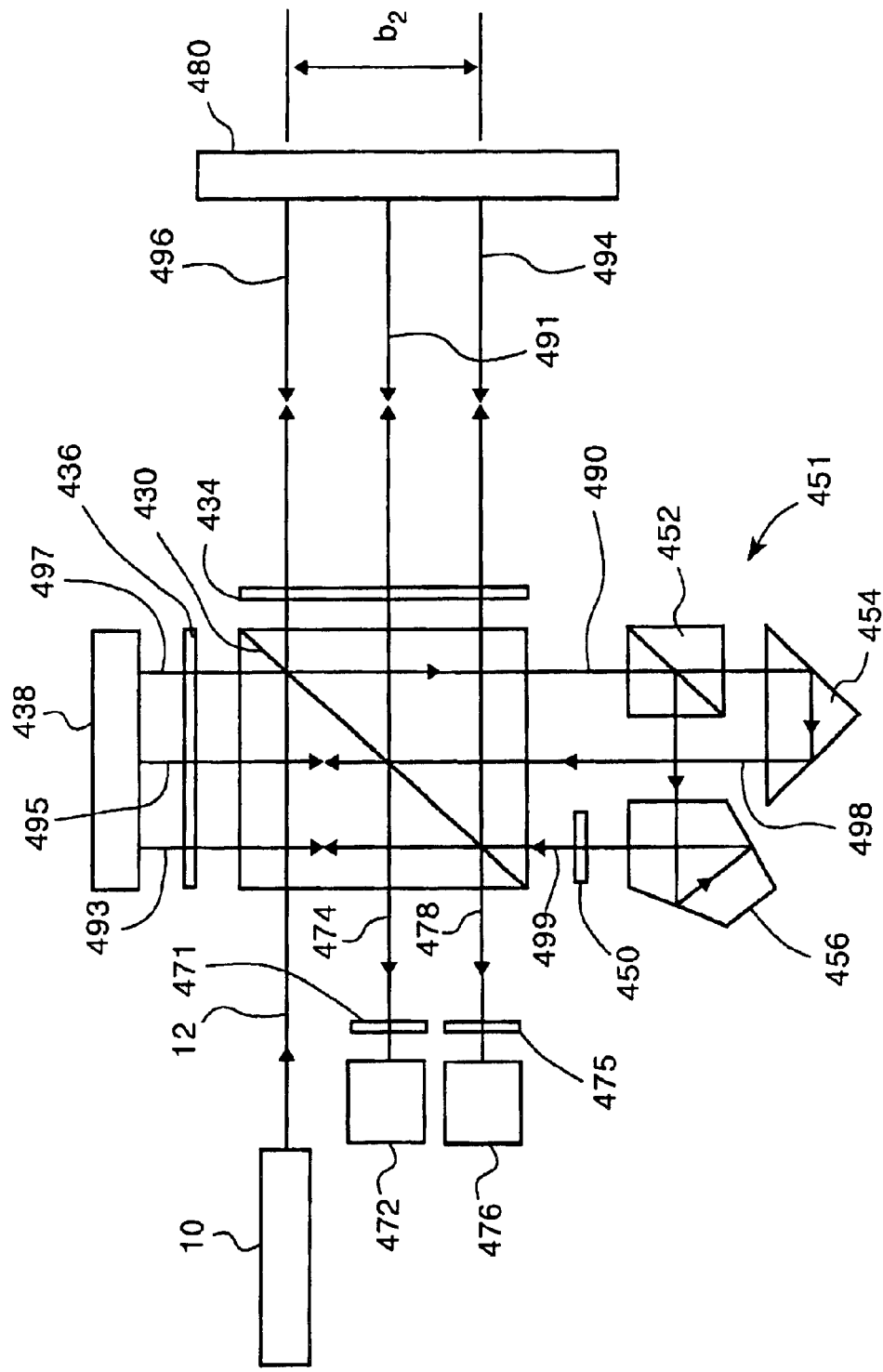
FIG. 4a is a plan view of a third embodiment of an interferometric system.

Referring to FIG. 4a, source 10 produces input beam 12 and directs it to polarizing beam-splitter 430, which separates it into beams 496 and 497. Beam 496 may thought of as a "primary" measurement beam that includes an angle-measuring beam and an overlapping distance-measuring beam (corresponding to the measurement beam for the HSPMI). Beam 497 may be thought of as a "primary" reference beam that includes another angle measuring beam and an overlapping distance-measuring beam (corresponding to the reference beam for the HSPMI).

Beam 496 is transmitted by polarizing beam-splitter 430, reflects from a plane mirror measurement object 480, and then returns to polarizing beam-splitter 430 after double passing a quarter-wave retardation plate 434, which rotates its linear polarization by 90 degrees. Because of the double pass, polarizating beam-splitter 430 now reflects beam 496 to a return beam assembly 451. Beam 497 is reflected by polarizing beam-splitter 430, reflects from a plane mirror reference object 438, and then returns to polarizing beam-splitter 430 after double passing a quarter-wave retardation plate 436, which rotates its linear polarization by 90 degrees. Because of the double pass, polarizating beam-splitter 430 now transmits beam 497 to return beam assembly 451. Moreover, polarizing beam-splitter recombines beams 496 and 497 to define intermediate beam 490.

Return beam assembly 451 includes a non-polarizing beam-splitter 452 that separates the intermediate beam into multiple beams including beam 498, which is transmitted by beam-splitter 452 and then directed back to polarizing beam-splitter 430 by retroreflector 454, and beam 499, which is reflected by beam-splitter 452, redirected towards polarizing beam-splitter 430 by penta-prism 456, and then transmitted by half-wave retardation plate 450 prior to reaching polarizing beam-splitter 430. The half-wave retardation plate is oriented to rotate the linear polarizations of the components in beam 499 by 90 degrees.

Figure 4B:
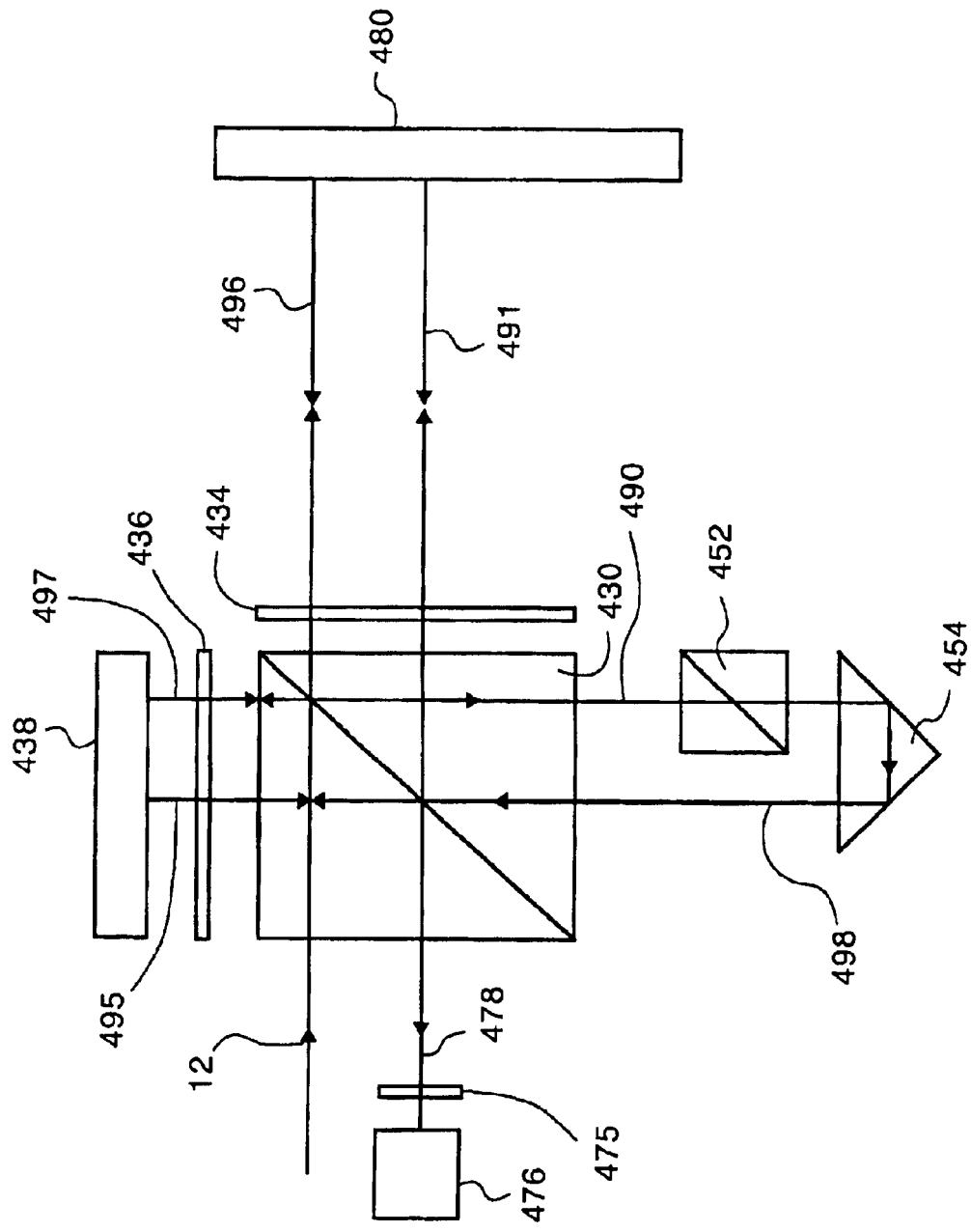
FIG. 4b is a plan view of a portion of the third embodiment of the interferometric system.

Beam 498 includes as components the distance-measuring beam from the primary measurement beam 496 and the distance-measuring beam from the primary reference beam 497. Polarizing beam-splitter 430 receives beam 498 and reflects the component derived from the primary measurement beam towards plane mirror measurement object 480 to define a secondary measurement beam 491 and transmits the component derived from the primary reference beam to plane mirror reference object 438 to define a secondary reference beam 495. Beams 491 and 495 reflect from their respective plane mirrors, double pass their respective quarter-wave retardation plates, and are then recombined by polarizing beam-splitter 430 to form distance-measuring output beam 474. Accordingly, the distance-measuring output beam includes a component that contacts the measurement object twice, a first time along a common path defined by the primary measurement beam and a second time along a different path defined by the secondary measurement beam. The other component of the distance-measuring output beam contacts the plane mirror reference object twice, a first time as the distance-measuring component of the primary reference beam and a second time as the secondary reference beam. The orthogonal polarizations of the components of the distance-measuring output beam are then mixed by polarizer 471 and the intensity of the resulting beam is measured by detector 472. FIG. 4b shows the portions of the interferometer that form the HSPMI and produce the distance-measuring output beam.

Figure 4C:
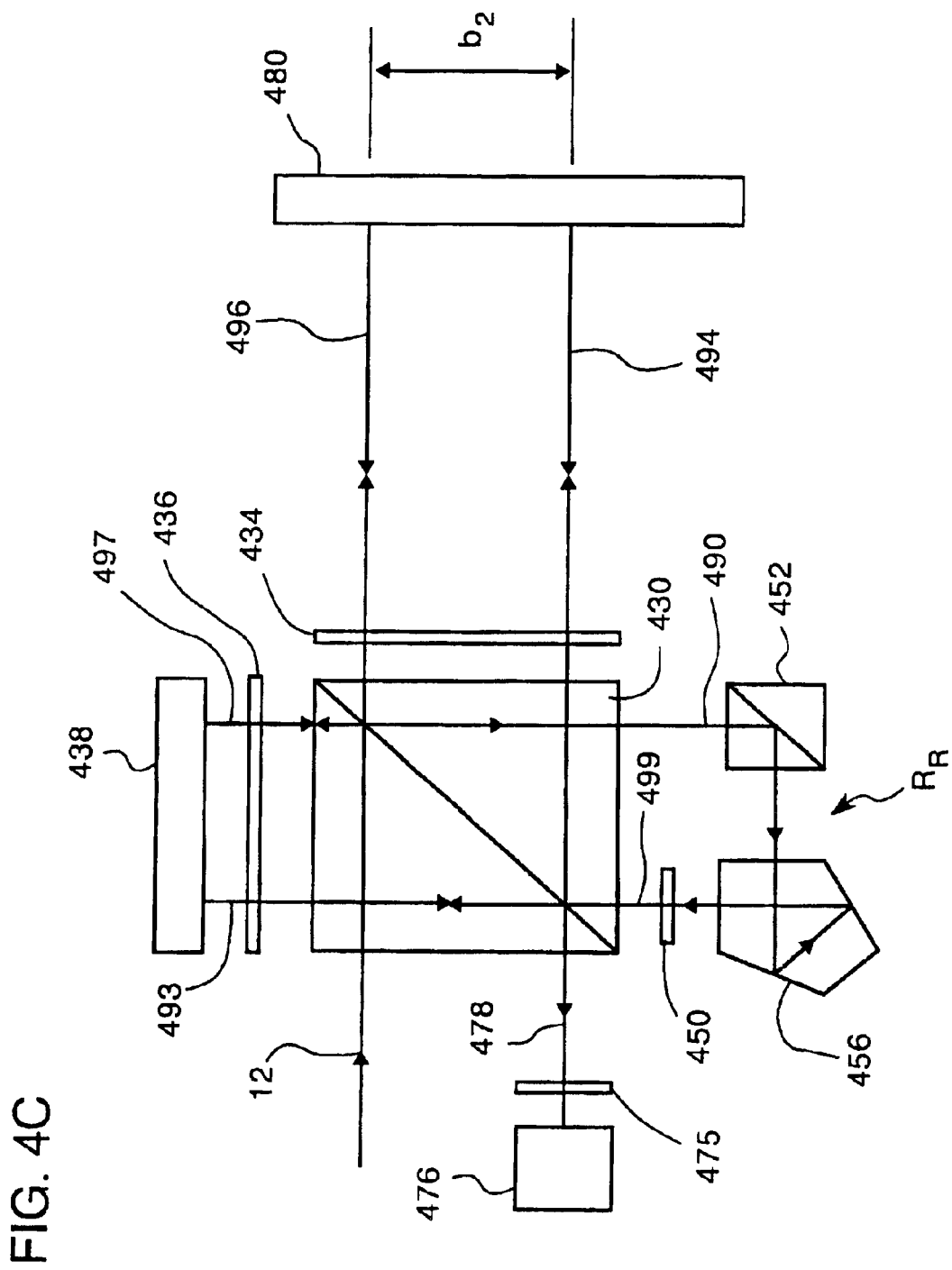
FIG. 4c is a plan view of another portion of the third embodiment of the interferometric system.

Beam 499 includes as components the angle-measuring beam from the primary measurement beam 496 and the angle-measuring beam from the primary reference beam 497. Polarizing beam-splitter 430 receives beam 499 and transmits the component derived from the primary measurement beam towards plane mirror reference object 438 to define a secondary beam 493 and reflects the component derived from the primary reference beam to plane mirror measurement object 480 to define a secondary beam 494. Beams 493 and 494 reflect from their respective plane mirrors, double pass their respective quarter-wave retardation plates, and are then recombined by polarizing beamsplitter 430 to form angle-measuring output beam 478. Accordingly, the angle-measuring output beam includes a first component that contacts the measurement object once along the common path defined by the primary measurement beam and then contacts the reference object as secondary beam 493 and a second component that contacts the reference object once as the angle-measuring component of the primary reference beam and then contacts the measurement object once as secondary beam 494. The orthogonal polarizations of the components of the angle-measuring output beam are then mixed by polarizer 475 and the intensity of the resulting beam is measured by detector 476. FIG. 4c shows the portions of the interferometer that form the angular displacement interferometer and produce the angle-measuring output beam.

The angular displacement interferometer introduces a relative phase shift $\phi_2$ between the components of the angle-measuring output beam for a change $\theta_2$ in the angular orientation of the plane mirror measurement object in the planes of FIGS. 4a and 4c. Relative phase shift $\phi_2$ and angular change $\theta_2$ are related according to the formula $$\phi_2 = k_2 n_2 b_2 \theta_2 \qquad (2)$$

where $b_2$ is the spacing between the beams on the measurement object (see FIGS. 12a and 12c) at the plane mirror, wavenumber $k_2 = 2\pi/\lambda_2$ for wavelength $\lambda_2$ of input beam 12, and $n_2$ is the index of refraction of a gas in the reference and measurement beam paths.

Figure 4D:
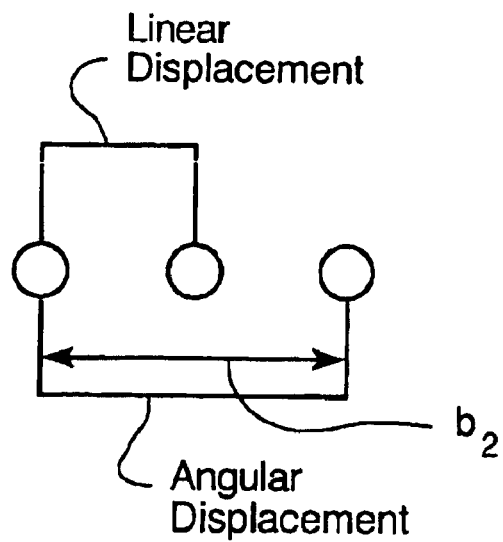
FIG. 4d is a diagram depicting the arrangement of beam spots on the plane mirror measurement object in the second embodiment of the interferometric system.
Figure 4E:
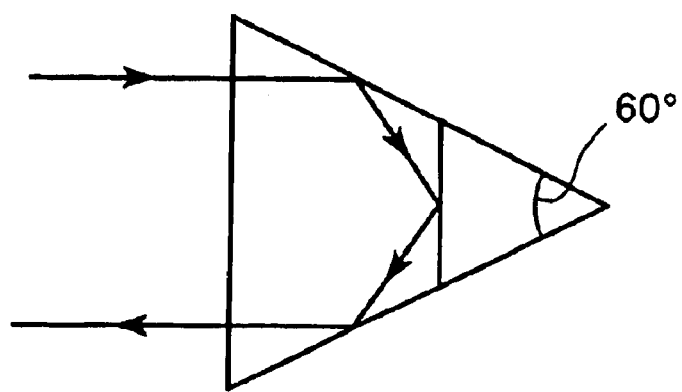
FIG. 4e is a schematic diagram of a component that can be used in embodiments of the interferometric system.

The arrangement of the beam spots on the plane mirror measurement object 480 is shown in FIG. 4d. The spots form a linear array with the measurement axis for the linear displacement interferometer displaced from a line parallel to and centered between the reference and measurement beams of the angular displacement interferometer. For the interferometer assembly shown schematically for the embodiment of FIG. 4a as a non-limiting example, the displacement is equal to nominally one half of the separation of the measurement beams of the linear displacement interferometer at the plane mirror.

The combination of non-polarizing beam-splitter 452 operating as a mirror and penta prism 456 has the image inverting properties of a single reflecting surface (indicated as R in FIG. 4c), just mirrors 347, 348, and 349 in the second embodiment. As a result, the angular displacement interferometer shown in FIG. 4a is configured such that the components of the angle-measuring output beam propagate parallel to one another even when the primary and secondary measurement beams contact the measurement object at non-normal incidence. Moreover, it is configured so that there is a reduced relative beam shear between the components of the angle-measuring output beam within the angular displacement interferometer and at detector 476 or an optical fiber pickup. As described above, the relative beam shear is equal to $2\alpha_2 l_2/n_2'$ where $\alpha_2$ is a change in angular orientation of the plane mirror measurement object in the plane of FIG. 4a, $l_2$ is the difference in physical lengths of the angle-measuring beams from the plane mirror measurement object to the polarizing beam splitter 430 where they are combined to form the angle-measuring output beam, and $n_2'$ is the index of refraction of the glass in the interferometer. The length $l_2$ is independent of linear displacements of the plane mirror measurement object. Also, the angular displacement interferometer shown in FIG. 4a is configured so that the path lengths in glass are the same for the different output beam components, wherein the angular displacement interferometer is insensitive to changes in temperature of the angular displacement interferometer. The angular displacement interferometer is further configured so that the path lengths in the gas are the same for the different output beam components, wherein the angular displacement interferometer is insensitive to environmental changes in the density of the gas in the corresponding beam paths.

An advantage of the embodiment of FIG. 4a is that the beams used in the measurement of angular displacements make single passes to the plane mirror measurement object. The single pass configuration for the angular displacement interferometer has a reduced number of sources for generation of cyclic non-linearities as compared to the number of sources possible in a multi-pass interferometer configuration. However, in additional embodiments of the invention, the angular displacement interferometer may also be configured so that the beams used in the angular displacement interferometer make multiple passes to the measurement object.

Another advantage of the embodiment of FIG. 4a is that the linear and angular displacement output beams have a common measurement beam path in a pass to the plane mirror measurement object. That path corresponds to that of primary measurement beam 1291.

Another advantage of the embodiment of FIG. 4a is that the position of the beams on the plane mirror measurement object that are used in the angular displacement interferometer do not shear as the angular orientation of the measurement object changes. This is a consequence of the fact that the each component in the angle-measuring output beam only contacts the plane mirror measurement object once.

The combination of the non-polarizing beam-splitter operating as a mirror and the Penta prism that is indicated as R in FIG. 4c has as cited above the image inverting properties of a single reflecting surface. The combination of the reflection by the non-polarizing beam-splitter and the Penta prism indicated as R in FIG. 4c also has the image inverting properties of the multiple-reflecting-surface reflector shown in FIG. 4e. The reflector shown in FIG. 4e may alternatively be used in place of reflector R (in either the second or third embodiment) with one facet of the reflector in FIG. 4e serving the function of the non-polarizing beam-splitter.

Additional embodiments of the fold optics for the angle-measuring beams in the second and third embodiments may include other combinations of reflective surfaces in the return beam assembly to provide the image inverting properties of a single reflecting surface described above. In general, the set of reflective surfaces reflect angle-measuring portion of the intermediate beam such that a sum of angles between incident and reflected beams at each of the reflective surfaces is zero or an integer multiple of 360 degrees, wherein each angle is measured in a direction from the incident beam to the reflected beam and has a positive value when measured in a counter clockwise direction and a negative value when measured in a clockwise direction. In many embodiment, there are an odd number of reflections from surfaces that have normals in a common plane.

Figure 5A:
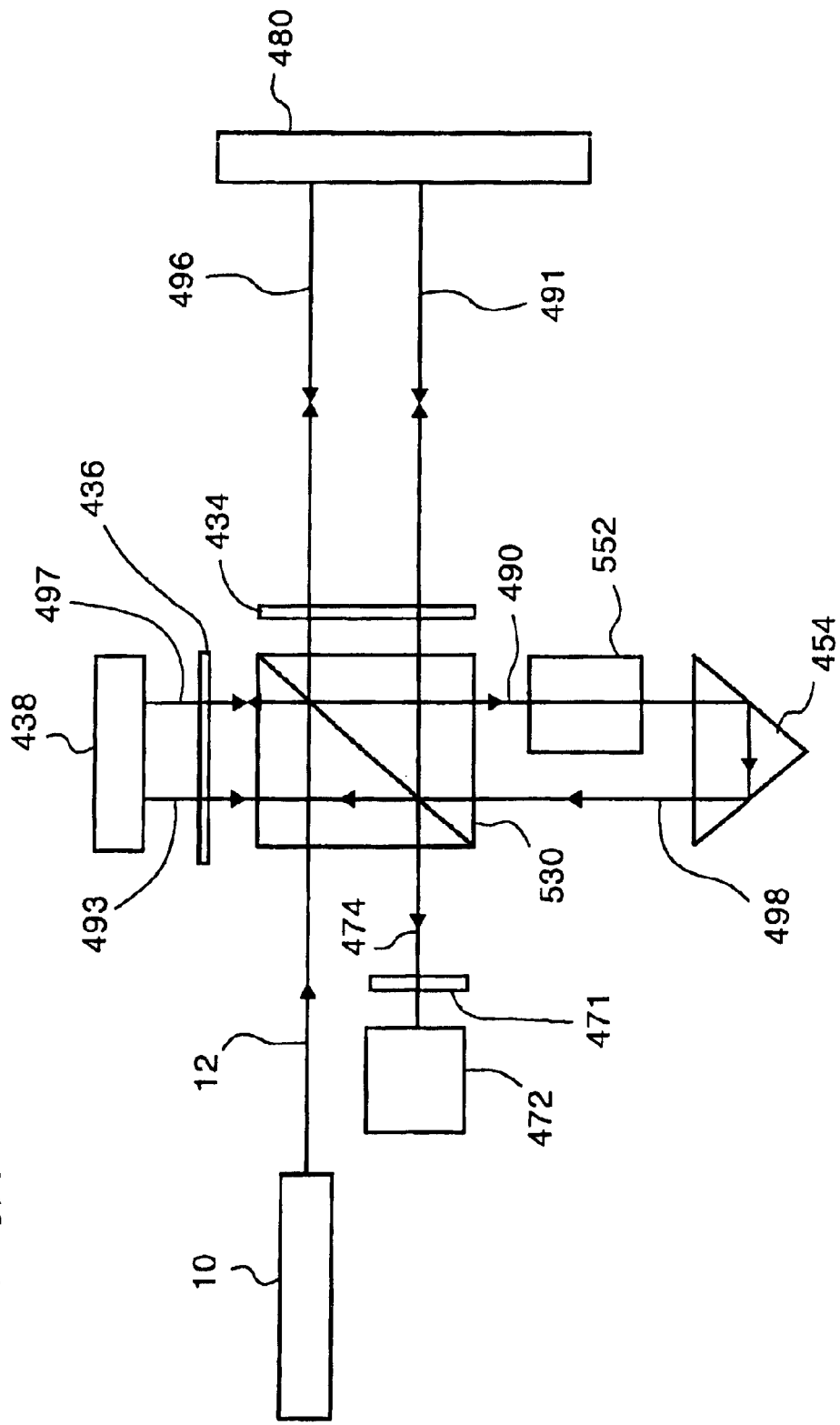
FIG. 5a is a plan view of a first plane of a fourth embodiment of an interferometric system.
Figure 5B:
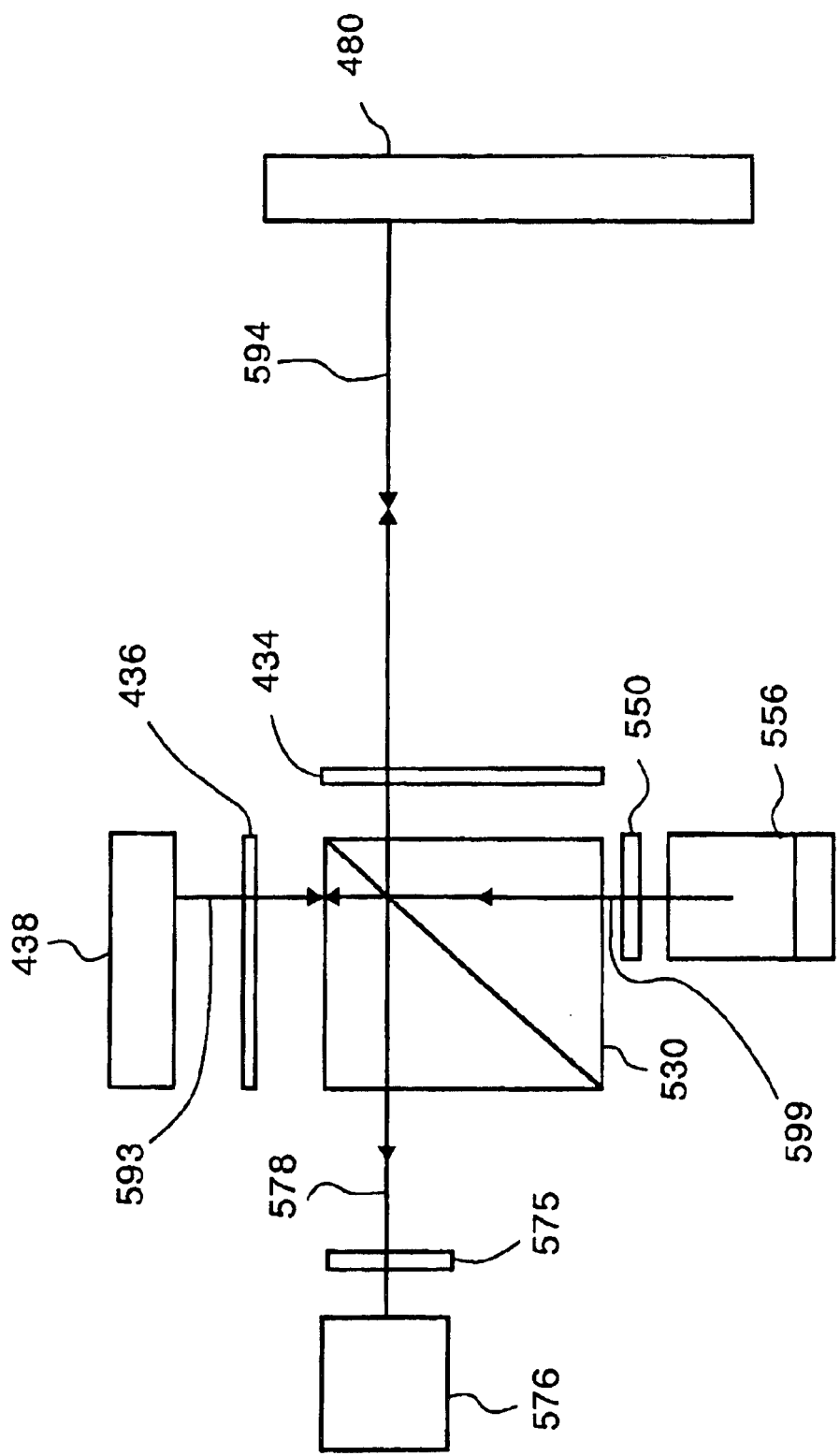
FIG. 5b is a plan view of a second plane of the fourth embodiment of the interferometric system.
Figure 5C:
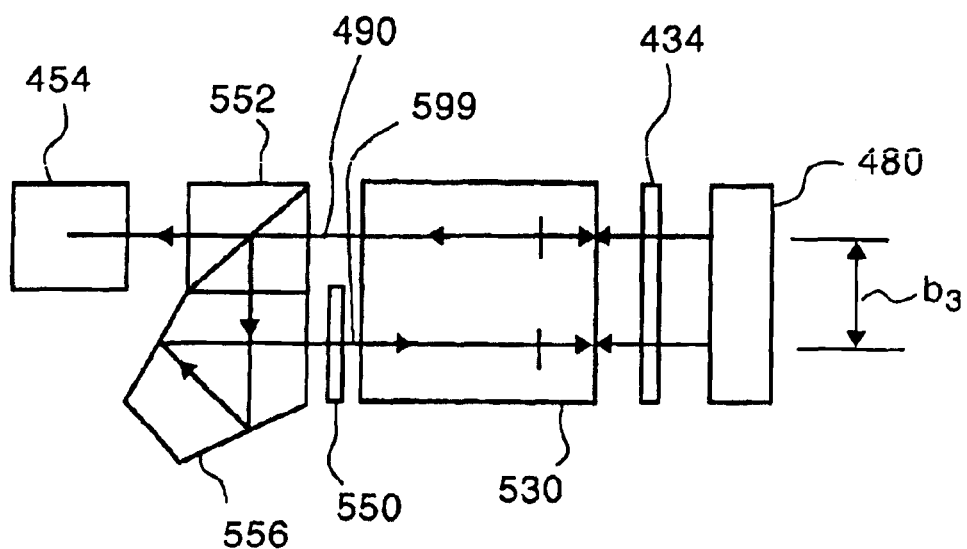
FIG. 5c is a side-view of the fourth embodiment of the interferometric system.

FIGS. 5a, 5b, and 5c depict in schematic form another embodiment of the interferometer of the present invention. The embodiment is similar to that of FIG. 4a in that it includes both a linear displacement interferometer (e.g., a HSPMI) and an angular displacement interferometer. However, in the present embodiment the plane of the measurement beams of the linear displacement interferometer and the plane in which angular displacements are measured are orthogonal. The planes of FIGS. 5a and 5b are parallel and displaced one with respect to the other by distance $b_3$ as shown in FIG. 5c. FIG. 5c depicts in schematic form a view of the interferometer assembly as seen from the side. Many of the elements of the interferometer are identical to those of the embodiment of FIG. 4a and have the same reference numerals.

The linear displacement interferometer in the embodiment of FIGS. 5a–5c is an HSPMI identical that in the embodiment of FIG. 4a. The plane defined by the reference and measurement beams of the HSPMI lies in the plane of FIG. 5a.

The operation of the angular displacement interfeometer in the embodiment of FIGS. 5a–5c is identical to that of the embodiment of FIG. 4a up to the generation of intermediate beam 490. In the subsequent manipulation of the intermediate beam, non-polarizing beam-splitter 552 replaces beam-splitter 452 and penta prism 556 replaces penta prism 456. Also, polarizing beam-splitter 530 replaces polarizing beam-splitter 430, and half-wave retardation plate 550 replaces half-wave retardation plate 450.

Referring to FIGS. 5a–5c, beam-splitter 552 receives intermediate beam 490 and reflects a portion of it corresponding to the angle-measuring beams out of the plane of FIG. 5a, where it reflected by penta-prism 556 back towards polarizing beam-splitter 530 in the plane of FIG. 5b, and passes through half-wave retardation plate 450 prior to reaching the polarizing beam splitter as beam 599. As in the embodiment of FIG. 4a, the half-wave retardation plate rotates the linear polarizations of the components of beam 599 by 90 degrees. Polarizing beam-splitter 530 then separates 599 into secondary beams 593 and 594 to ultimately produce angle-measuring output beam 578 in a manner analogous to that of secondary beams 493 and 494 in the embodiment of FIG. 4a. The orthogonal polarizations of the components of angle-measuring output beam are then mixed by polarizer 575 and the intensity of the resulting beam is measured by detector 576.

The angular displacement interferometer introduces a relative phase shift $\phi_3$ between the components of angle-measuring output beam 578 for a change $\theta_3$ in the angular orientation of the plane mirror measurement object in the plane orthogonal to the plane of FIG. 5b. Relative phase shift $\phi_3$ and angular change $\theta_3$ are related according to the formula $$\phi_3 = k_3 n_3 b_3 \theta_3 \quad (3)$$

where $b_3$ is the spacing between the reference beam and measurement beam (see FIG. 5c), wavenumber $k_3 = 2\pi/\lambda_3$ for wavelength $\lambda_3$ of the input beam 12, and $n_3$ is the index of refraction of a gas in the reference and measurement beam paths.

Figure 5D:
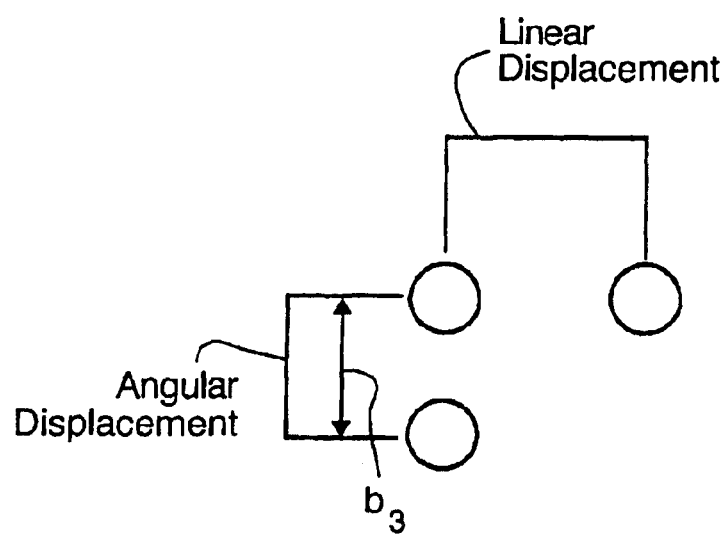
FIG. 5d is a diagram depicting the beam spots on the plane mirror measurement object in the fourth embodiment of the interferometric system.

The arrangement of the beam spots on the plane mirror measurement object is shown in FIG. 5d. The embodiment of FIGS. 5a–5c includes advantages similar to those described above.

Figure 6A:
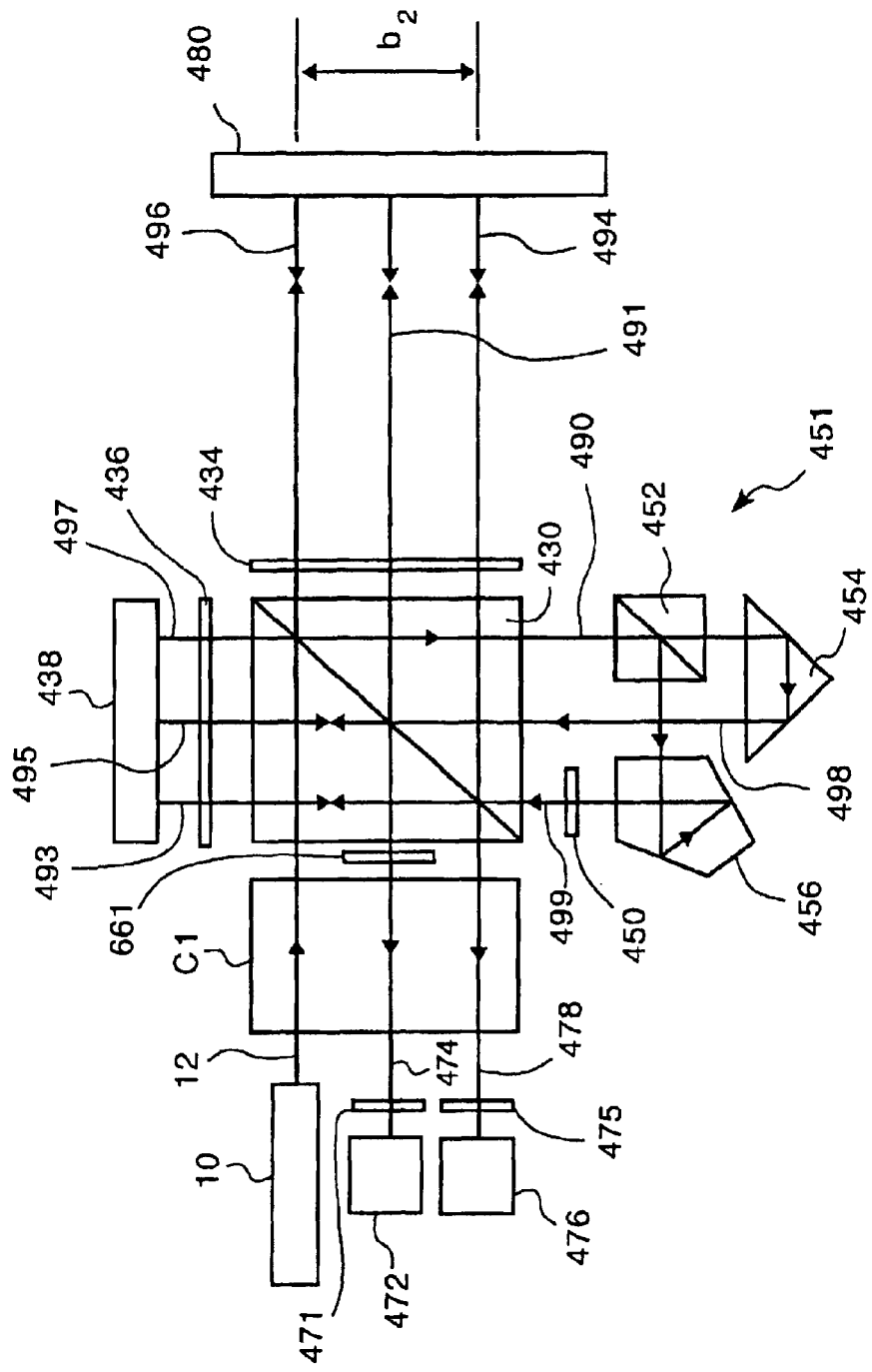
FIG. 6a is a plan view of another embodiment of an interferometric system.

FIG. 6a depicts in schematic form another embodiment of the interferometer of the present invention. The embodiment is identical to that of FIG. 4a except that it further includes a compensating element C1 and a half-wave retardation plate 661 positioned to receive distance-measuring output beam 674 prior to element C1. Many of the elements of the interferometer are identical to those of the embodiment of FIG. 4a and have the same reference numerals.

The function of element C1 is to further reduce or even eliminate the reduced relative beam shear between the reference and measurement beam components of the output beam of the angular displacement interferometer that is present in the second embodiment. Path lengths in glass and in a gas for the beams of the angular displacement interferometer are maintained equal. The compensating element(s) makes the beams that corresponds to the two components in the angle-measuring output beam have an equal path length from when they contact the measurement object to when they are combined by the polarizing beam splitter to produce the angle-measuring output beam. As a result, any transverse displacement caused by the non-normal reflection of the angle-measuring beams from the measurement object is equal for the two components of the angle-measuring output beam.

Figure 6B:
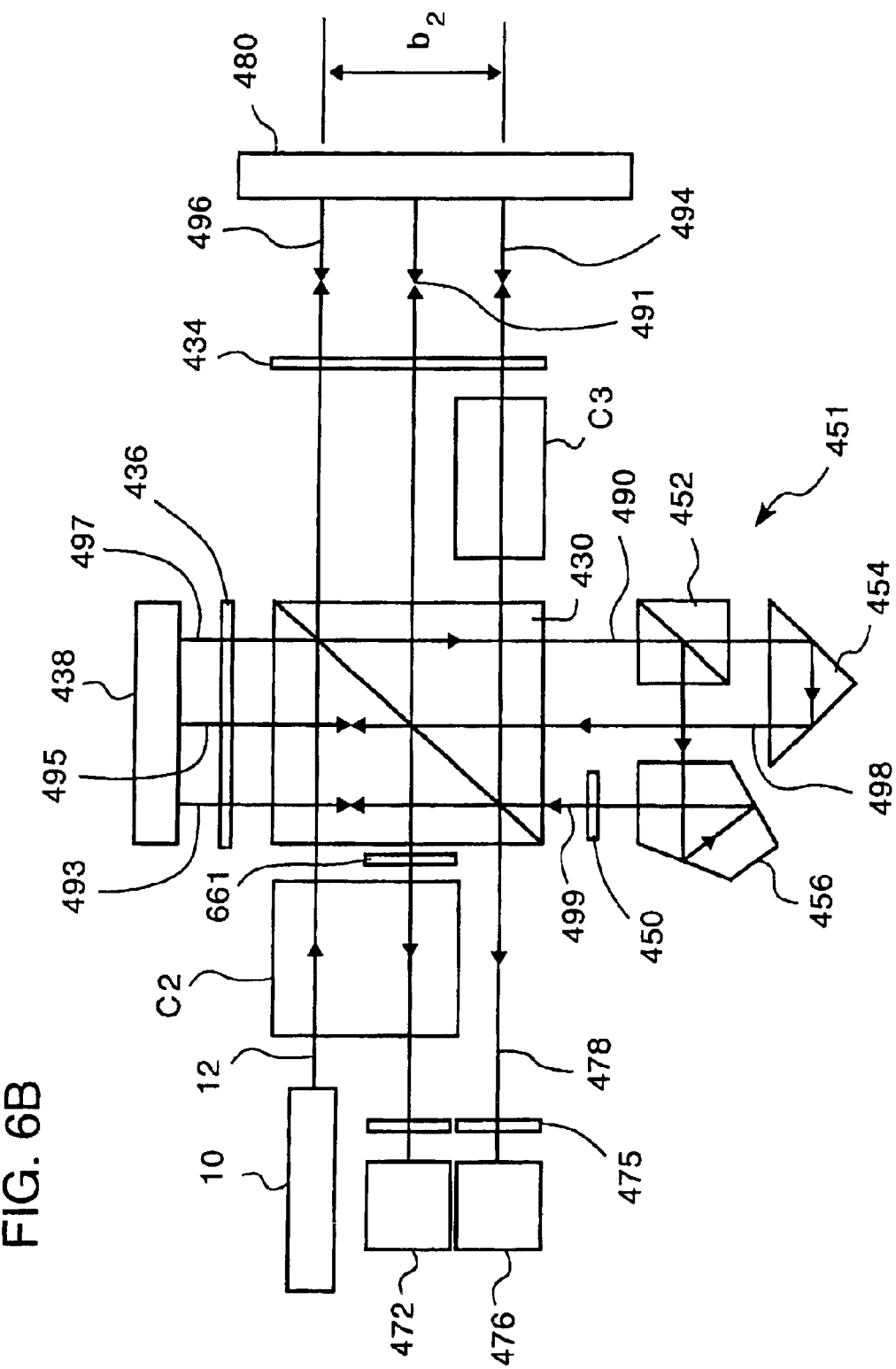
Figure 6C:
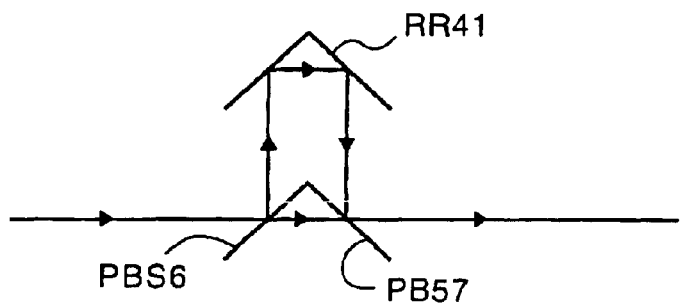
FIGS. 6c–6e are schematic diagrams of three compensating elements.
Figure 6D:
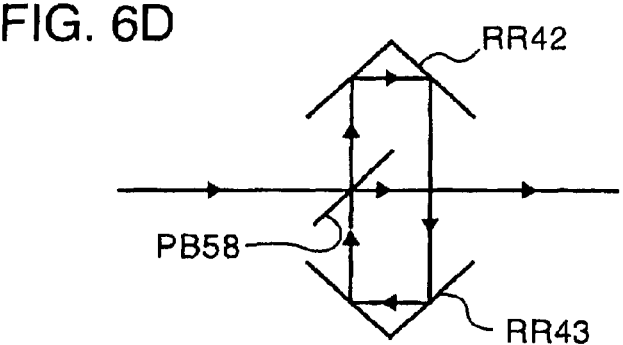
Figure 6E:
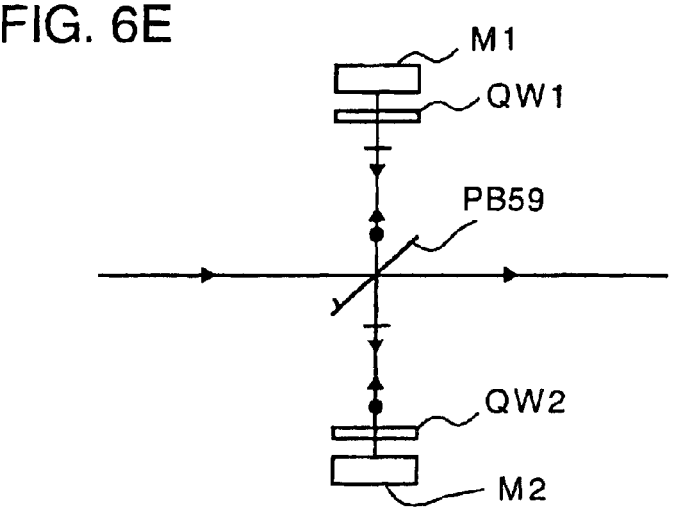

Three embodiments of element C1 are shown in FIGS. 6c, 6d, and 6e. The planes of FIGS. 6c, 6d, and 6e are orthogonal to the plane of FIG. 6a. The difference in path lengths for the beam components of the output beam of the angular displacement interferometer is set equal to $l_2$ and the index of refraction of the glass in element C1 is the same as $n_2'$. As a consequence, there is no relative shear between the reference and measurement beam components of the output beam of the angular displacement interferometer in either the interferometer assembly or at a detector or at a fiber-optic pick-up (FOP).

FIG. 6c shows an embodiment of element C1 including two polarizing beam splitters PBS6 and PBS7 in conjunction with a retro reflector RR41.

FIG. 6d shows an embodiment of element C1 including a polarizing beam splitter PBS8, and two retro reflectors RR42 and RR43.

FIG. 6e shows an embodiment of element C1 including a polarizing beam splitter PBS9 in conjunction with two mirrors M1 and M2 and quarter waveplates QW1 and QW2.

The unbalance in reference and measurement beam path lengths in glass introduced by passage of the output beam from the angular displacement interferometer through element C1 is offset by the difference in optical path lengths experienced by the reference and measurement beam components of the input beam on passage through element C1. The half wave phase retardation plates shown in FIG. 6a rotate the polarizations of respective beams by 90 degrees so that the combination of the passage of the input beam and the output beams through element C1 gives rise to equal paths in glass for corresponding components of the output beams.

In addition to the further reduction in differential shear by compensating element C1, the embodiment of FIG. 6a includes advantages similar to those described above.

In further embodiments, one or more compensating elements may be deployed in a manner different from that of FIG. 6a. For example, compensating elements C2 and C3 may deployed as shown in FIG. 6b. In yet further embodiments, one or compensating elements may be similarly deployed in the embodiment shown in FIGS. 5a–5c to further reduce or even eliminate differential shear between the components of the angle-measuring output beam.

Figure 7A:
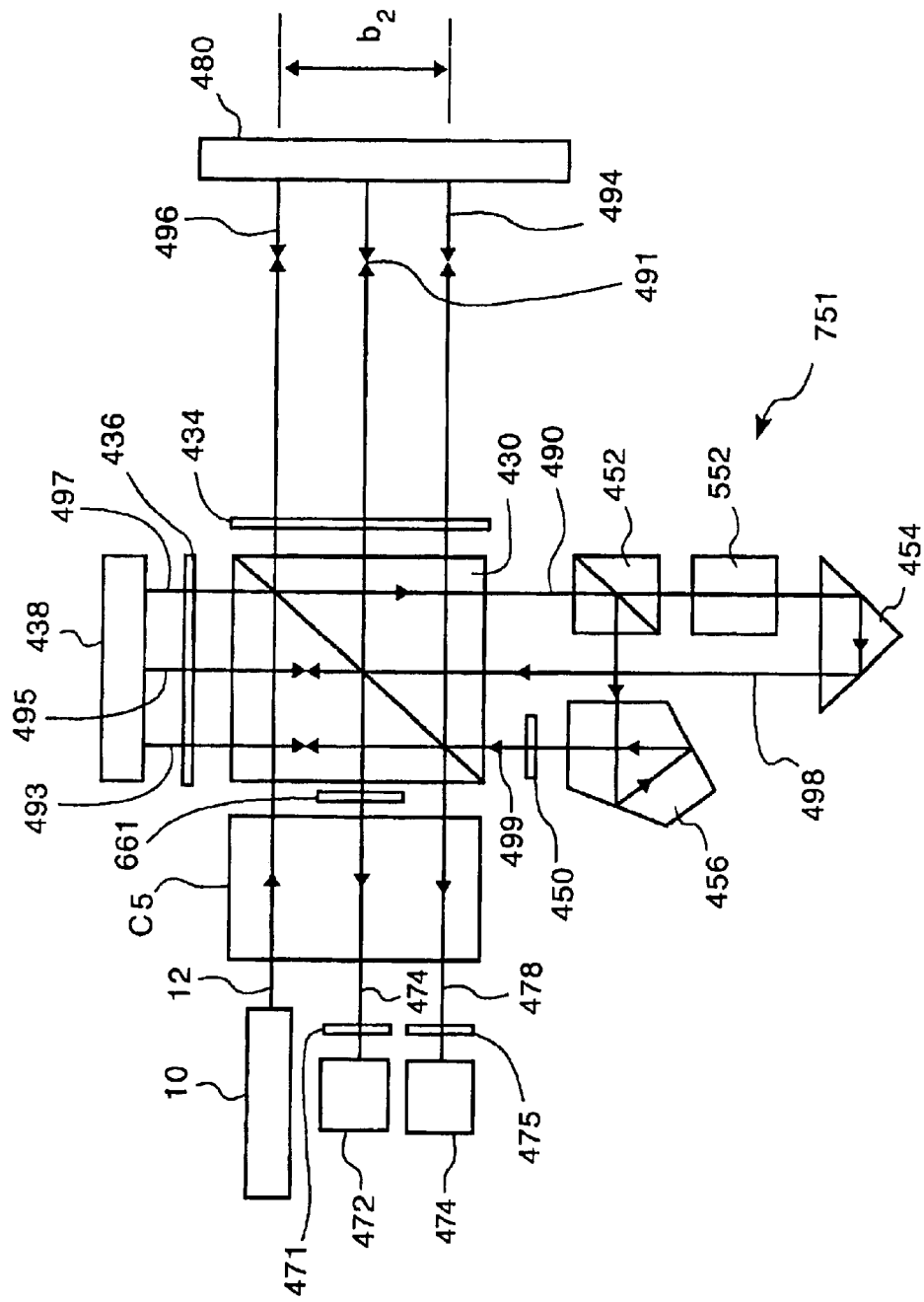
FIG. 7a is a plan view of a first plane of another embodiment of an interferometric system.
Figure 7B:
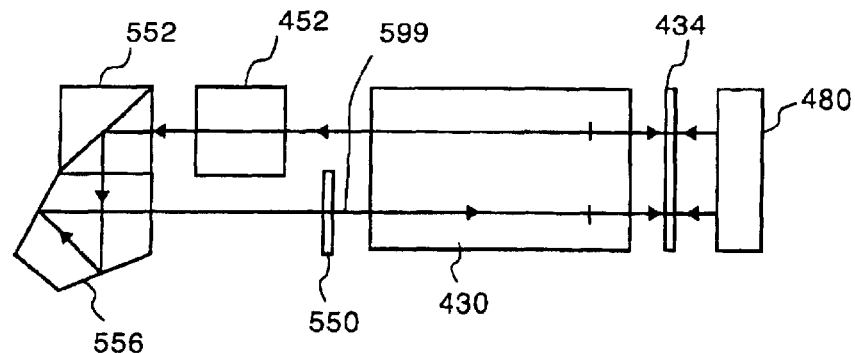
Figure 7C:
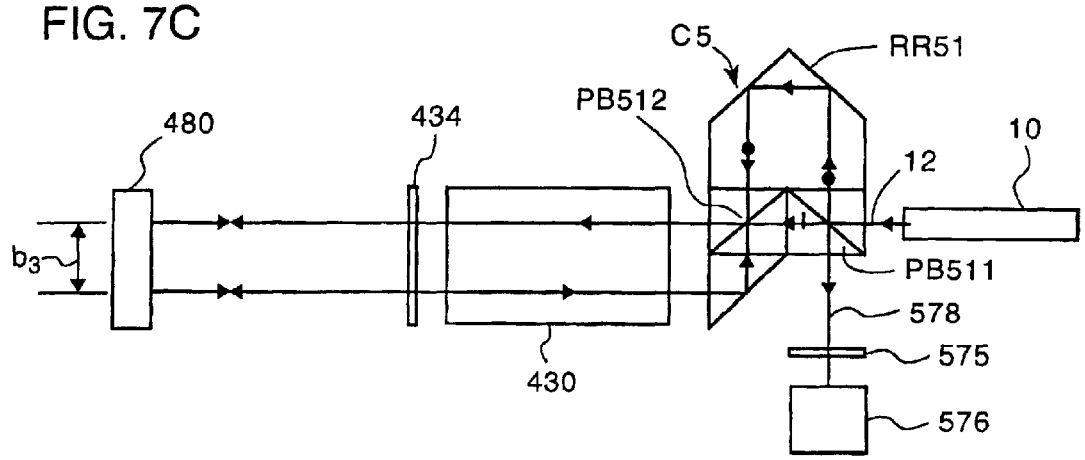

Another embodiment of the interferometer of the present invention is shown in FIGS. 7a–7c, which combines the elements of the embodiments of FIGS. 5a–5c and FIG. 6a to produce distance measuring output beam 474 and two angle-measuring output beams 478 and 578. The two angle-measuring output beams measure changes in the angular orientation of plane mirror measurement object with respect to two rotation axes that are normal to one another. To generate the three output beam, return beam assembly 751 includes both non-polarizing beam-splitters 452 and 552 and both penta prisms 456 and 556. The embodiment also includes compensating element C5 to further reduce differential shear between the components of angle-measuring output beams 478 and 578.

FIG. 7a shows a schematic diagram of the interferometer in the plane of distance measuring output beam 474, angle-measuring output beam 478, and the component beams used to produce those output beams. FIG. 7b shows a side-view of the interferometer including beam 599, which is split to produce the secondary beams used to produce the second angle-measuring output beam, output beam 578. FIG. 7c shows another side view of the interferometer.

The size of penta prism 456 relative to the size of penta prism 556 is designed so that the ratios of the beam shears and corresponding angular displacements of the plane mirror measurement object are the same for the output beam components of the two angular displacement interferometers. As a consequence, a single compensator C5 (see FIG. 7c) can be used for the linear displacement interferometer and the two angular displacement interferometers. The single compensator C5, shown in FIG. 7c, includes polarizing beam splitters PBS11 and PBS12, and retro reflector RR51.

Figure 7D:
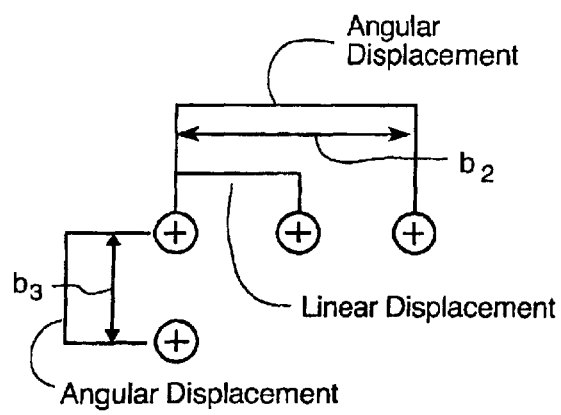
FIG. 7d is a diagram depicting the arrangement of beam spots on the a plane mirror in the embodiment of FIGS. 7a–7c.

The arrangement of the beam spots on the plane mirror measurement object is shown in FIG. 7d. In addition to the further reduction in differential shear by compensating element C5, the embodiment of FIGS. 7a–c includes advantages similar to those described above.

Figure 8B:
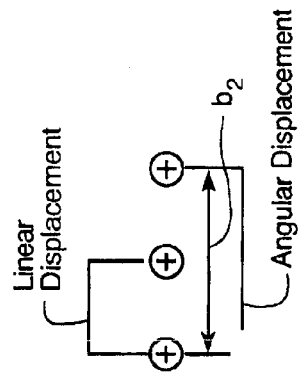
Figure 8A:
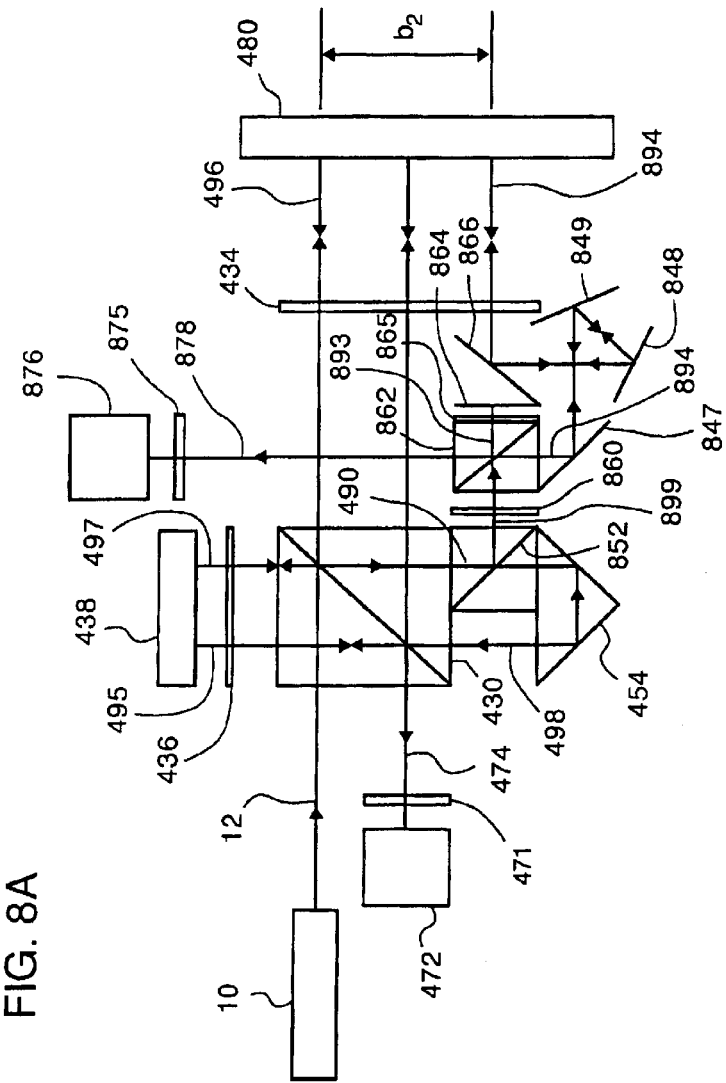
FIG. 8a is a plan view of another embodiment of an interferometric system.

FIG. 8a depicts in schematic form another embodiment of the interferometer of the present invention. The embodiment is similar to that of FIG. 6a except that rather than include compensating element C1, a compensating block of optics is included to directly add path length to the secondary beam that contacts the plane mirror measurement object so to equalize the path length of the components the angle-measuring output beam from when they contact the measurement object to when they are combined by the polarizing beam splitter to form the angle-measuring output beam (i.e., to make the path length difference $l_2$ in the embodiment of FIG. 4a zero). As a result, the compensating block eliminates differential beam shear between the components of the angle-measuring output beam.

The linear displacement interferometer in the embodiment of FIG. 8a is an HSPMI identical that in the embodiment of FIG. 4a. The operation of the angular displacement interferometer in the embodiment of FIG. 8a is identical to that of the embodiment of FIG. 4a up to the generation of intermediate beam 490. In the subsequent manipulation, non-polarizing beam-splitter 852 reflects the angle-measuring components of intermediate beam 490 to define beam 899, which is then transmitted by half-wave retardation plate 860 to rotate the linear polarizations of the components of the beam 899 by 90 degrees. Beam 899 is then incident on another polarizing beam-splitter 862, which transmits the component of beam 899 derived from the primary measurement beam to define secondary beam 893 and reflects the component of beam 899 derived from the primary reference beam to define secondary beam 894. Secondary beam 893 reflects from mirror 864 and returns to polarizing beam-splitter 862 after double-passing a quarter-wave retarder 865, at which point polarizing beam-splitter 862 reflects secondary beam 894 as a first component of an angle-measuring output beam 878. Secondary beam 894 reflects from mirrors 847, 848, and 849 and is then directed by mirror 866 to contact plane mirror measurement object 480. It then reflects from the measurement object and returns via mirrors 847, 848, 849, and 866 to polarizing beam-splitter 862, which transmits it as a second component of angle-measuring output beam 878. A polarizer 875 mixes the polarization components of angle-measuring output beam 878 before it impinges on detector 876.

The fold assembly defined by mirrors 847, 848, and 849 provides the image inverting properties of a single reflecting surface as described above. The relative positions of the beam spots on the plane mirror measurement object for the embodiment of FIG. 8a is shown in FIG. 8b.

Because of the compensating block associated with mirrors 864, 866, 847, 848, and 849, quarter-wave retarder 865, polarizing beam-splitter 862, and half-wave retarder 860 and the additional path length it introduces to secondary beam 894 during its pass to the measurement object, the embodiment of FIG. 8a is configured so that there is a zero relative beam shear between the beam components of angle-measuring output beam 878.

Figure 9A:
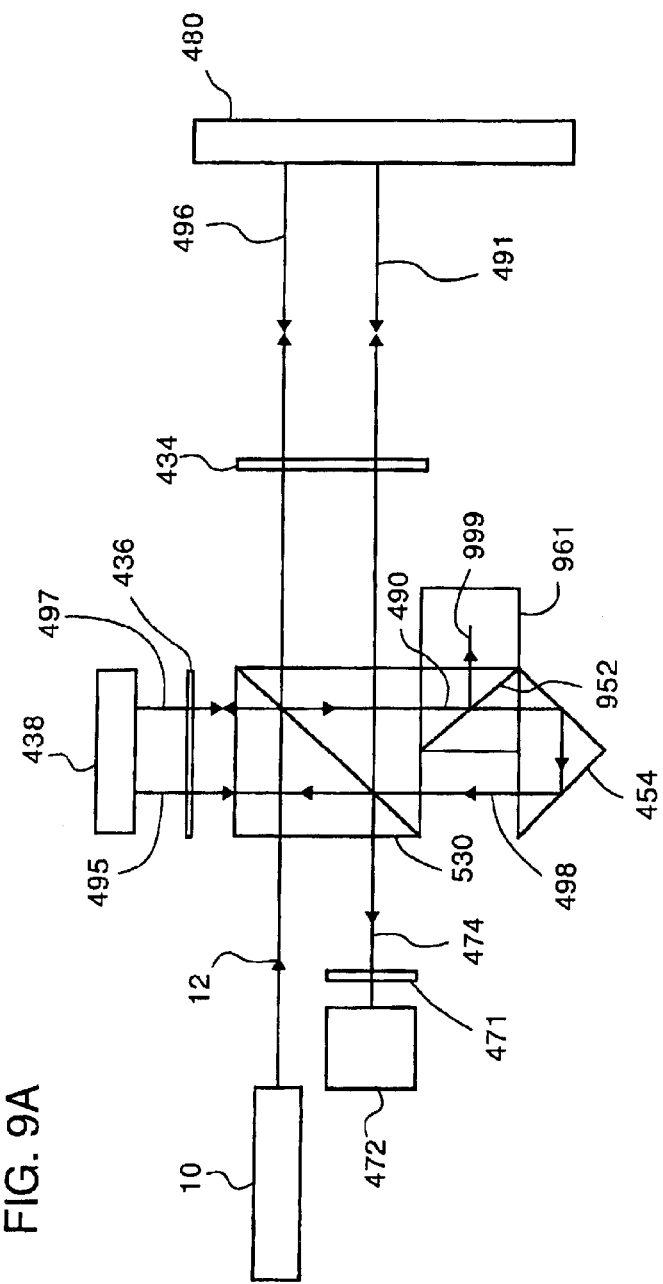
FIG. 9a is a plan view of a first plane of another embodiment of an interferometric system.
Figure 9B:
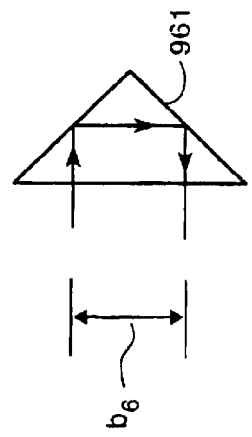
Figure 9C:
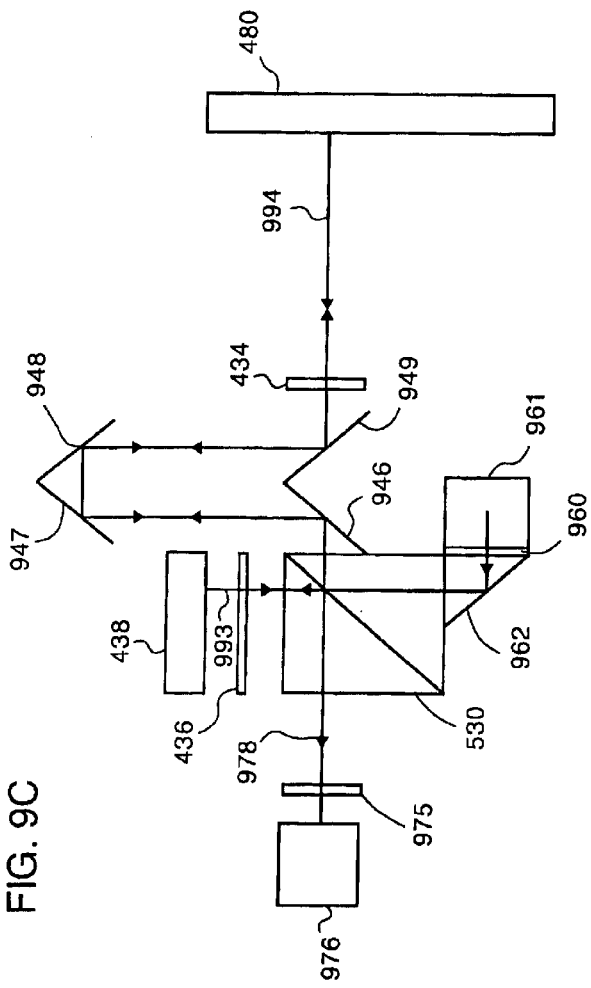

Another embodiment of the invention is shown in schematic form in FIGS. 9a–9c. The embodiments implements a compensating block like that in the embodiment of FIG. 8a to the interferometer of FIGS. 5a–5c. The planes of FIGS. 9a and 9c are parallel and displaced one with respect to the other by distance $b_6$ as shown in FIG. 9b.

The linear displacement interferometer in the embodiment of FIGS. 9a–9c is an HSPMI identical that in the embodiment of FIGS. 5a–5c. The operation of the angular displacement interferometer in the embodiment of FIGS. 9a–9c is identical to that of the embodiment of FIGS. 5a–5c up to the generation of intermediate beam 490. In the subsequent manipulation, non-polarizing beam-splitter 952 reflects the angle-measuring components of intermediate beam 490 to define beam 999, which is directed to the lower plane defined by FIG. 9c by prism 961 (shown also in FIG. 9b). Beam 999 then passes through half-wave retardation plate 960 to rotate the linear polarizations of the components of the beam 999 by 90 degrees, after which it is reflected by interface 962 back to polarizing beam splitter 530. Polarizing beam-splitter 530 transmits the component of beam 999 derived from the primary measurement beam to define secondary beam 993 and reflects the component of beam 999 derived from the primary reference beam to define secondary beam 994. Secondary beam 993 reflects from plane mirror reference object 438, double-passes quarter-wave retarder 436, and is then reflected by polarizing beam-splitter 530 as a first component of an angle-measuring output beam 978. Secondary beam 994 reflects from polarizing beam splitter 530 and then travels along a delay line formed by mirrors 946, 947, 948, and 949 before being incident on plane mirror measurement object 480. Secondary beam 994 then reflects from the measurement object, travels back along the delay line, and is then transmitted by polarizing beam-splitter 530 as a second component of angle-measuring output beam 978 (after having double passed quarter-wave retarder 934). A polarizer 975 mixes the polarization components of angle-measuring output beam 978 before it impinges on detector 976.

As described above, the angular displacement interferometer introduces a relative phase shift $\phi_6$ between the beam components of the angle-measuring output beam for a change $\theta_6$ in the angular orientation of the plane mirror measurement object in the plane of FIG. 9b and orthogonal to the planes of FIGS. 9a and 9c. Relative phase shift $\phi_6$ and angular change $\theta_6$ are related according to the formula $$\phi_6 = k_6 n_6 b_6 \theta_6 \qquad (4)$$

where $b_6$ is the spacing between the reference beam and measurement beam, wavenumber $k_6 = 2\pi/\lambda_6$ for wavelength $\lambda_6$ of the input beam, and $n_6$ is the index of refraction of a gas in the beam paths.

Figure 9D:
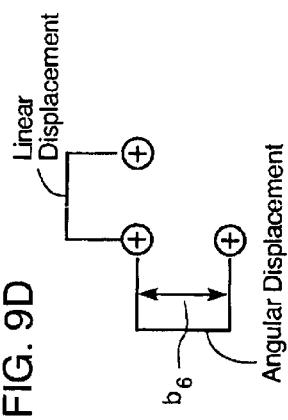
FIG. 9d is a diagram depicting the arrangement of beam spots on the plane mirror measurement object in the embodiment of FIGS. 9a–9c.

Because of the optical block including the delay line, the angular displacement interferometer of FIGS. 9a–9c is configured so that there is a zero relative beam shear between the beam components of the angle-measuring output beam within the angular displacement interferometer and at a detector or optical fiber pickup. The arrangement of the beam spots on the plane mirror measurement object is shown in FIG. 9d.

In yet another embodiment, the embodiments of FIG. 8a and FIGS. 9a–9c are combined in the same manner that the embodiments of FIGS. 5a–c and FIG. 6a are combined in the embodiment of FIGS. 7a–7c, to provide two angle-measuring output beams measuring changes in the angular orientation of the measurement object with respect to different degrees of freedom, each of which has zero differential shear between its beam components, and to also provide a distance-measuring output beam via an integrated HSPMI.

Figure 10A:
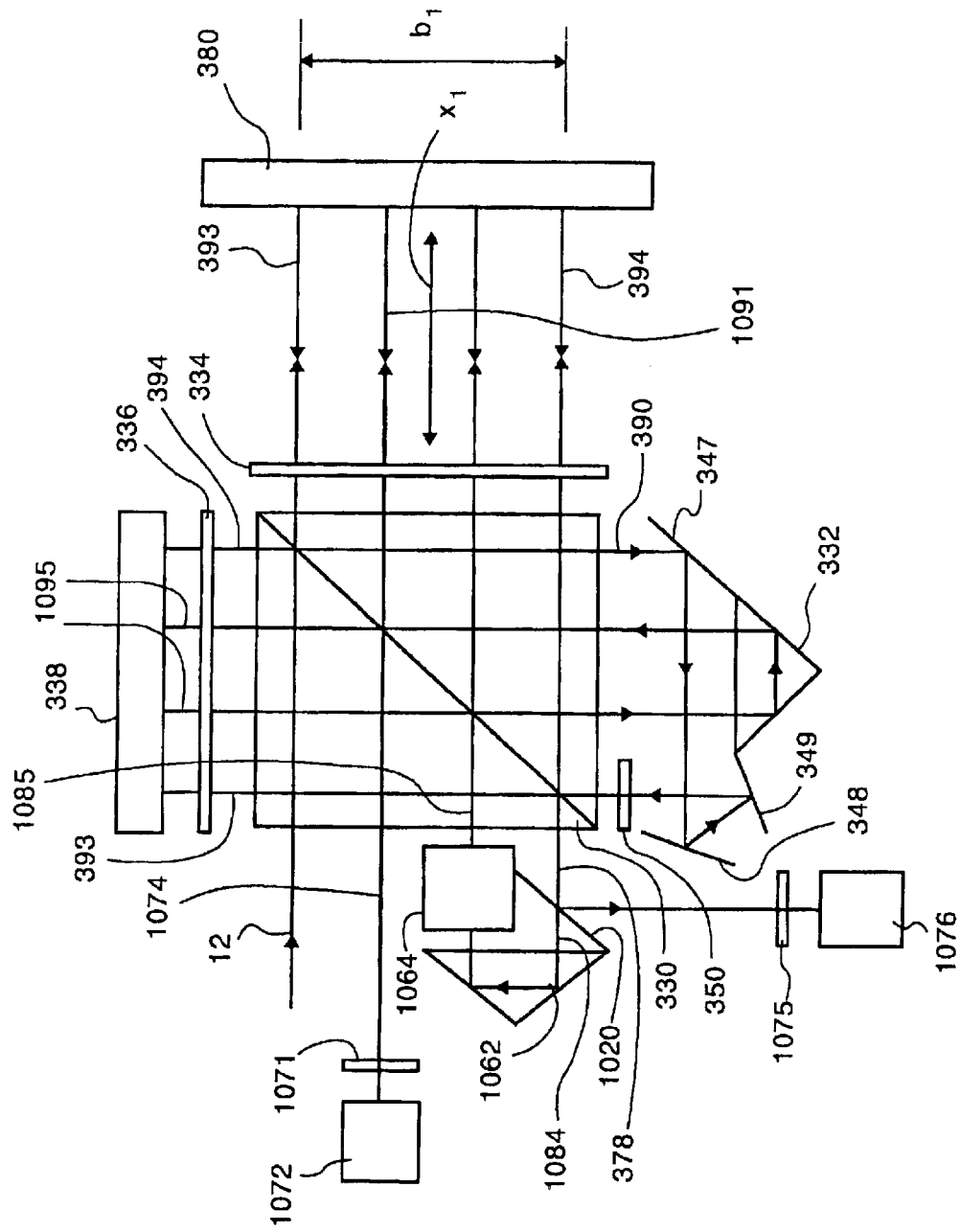
FIG. 10a is a plan view of another embodiment of an interferometric system.

In another embodiment of the invention shown in FIG. 10a, a multi-axis interferometer is disclosed that is similar to that of FIG. 3 in that it includes an angular displacement interferometer identical that of FIG. 3 and also includes a HSPMI. However, unlike the embodiment of FIG. 3, input beam 12 corresponds directly to the angle-measuring input beam and distance-measuring input beam is derived from the angle-measuring output beam.

Referring to FIG. 10a, input beam 12 is incident on polarizing beam-splitter 330, which splits it into angle-measuring beams 393 and 394, just as in the embodiment of FIG. 3. The angle-measuring beams progress through the system in a manner identical to that described in FIG. 3 to produce angle-measuring output beam 378. However, the embodiment of FIG. 10a includes a non-polarizing beam-splitter 1020 positioned to transmit a portion of it to define a distance-measuring input beam 1084 and reflect the remainder of it on to polarizer 1075 and detector 1076 to provide the angle information as in the embodiment of FIG. 3.

Distance-measuring input beam 1084 is then conditioned by a fold assembly including retroreflector 1062 and an afocal system 1064 having a magnification of 2:1 to produce a conditioned distance-measuring input beam 1085. The conditioned distance-measuring input beam is then incident on polarizing beam-splitter 330 to produce measurement beam 1091 and reference beam 1095, which progress through the system in a manner similar to measurement beam 391 and reference beam 395 in the embodiment of FIG. 3 to produce distance measuring output beam 1074. The distance-measuring output beam is then incident on polarizer 1071 and detector 1072 to provide distance information. The distance information will be similar to that measured by detector 372 in the embodiment of FIG. 3 except that it will include an additional phase term associated with the optical differencing inherent to the angle-measuring output beam.

The consequence of the conditioning of the distance-measuring input beam by the fold assembly is that measurement beam 1091 will contact plane mirror measurement object 380 at normal incidence, even when the measurement object is tilted in the plane of FIG. 10a. The reason for the normal incidence is that the distance-measuring input beam is derived from the angle-measuring output beam, which includes components that each contact the measurement object once. Thus, the propagation direction of the distance-measuring input beam changes in response to changes in the orientation of the measurement object. The magnification by afocal system 1064 adjusts the propagation direction of the distance-measuring input beam to produce the conditioned beam and cause the measurement beam derived from the conditioned beam to contact the plane mirror measurement object at normal incidence. Hence, any angular deviation ($\alpha$) introduced in the input distance measuring beam from the angular displacement interferometer caused by non-normal reflection from the measurement object will be reduced to $\alpha/2$. A benefit of the normal incidence of the measurement beam is that it will not undergo shear in response to changes in the angular orientation of the measurement object, and thus differential shear between the components of the distance-measuring output beam will be substantially reduced.

Suitable embodiments for afocal system 1064 may comprise afocal lenses and/or anamorphic afocal attachments [see, e.g., Chapter 2 entitled "Afocal Systems" by W. B. Wetherell in *Handbook Of Optics II*, Second Edition (McGraw-Hill)]. Below, a first embodiment is shown diagrammatically for an afocal system such as represented by a Galilean afocal lens. However, a Keplerian afocal lens can be used. If a Keplerian afocal lens is used for one or more afocal systems, the transformation properties of corresponding relay lens systems must be changed to reflect the inverting features of the Keplerian afocal lens. The afocal systems may also comprise anamorphic afocal attachments based on cyclindrical lenses, prisms, and birefringent elements.

Figure 10B:
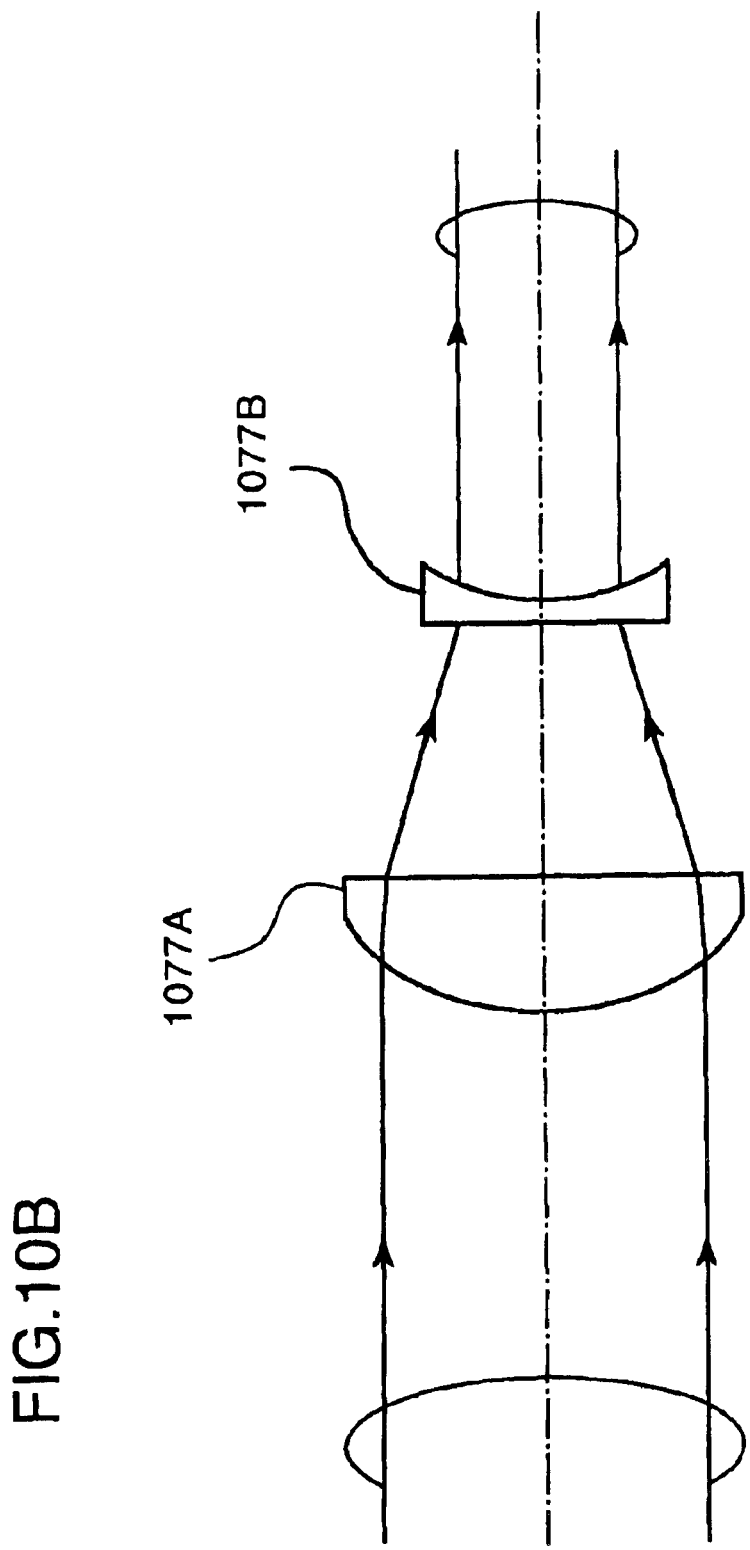
Figure 10C:
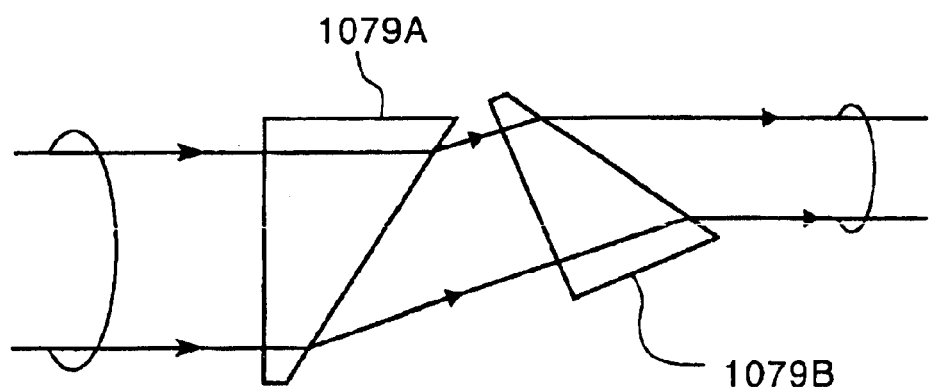
Figure 10D:
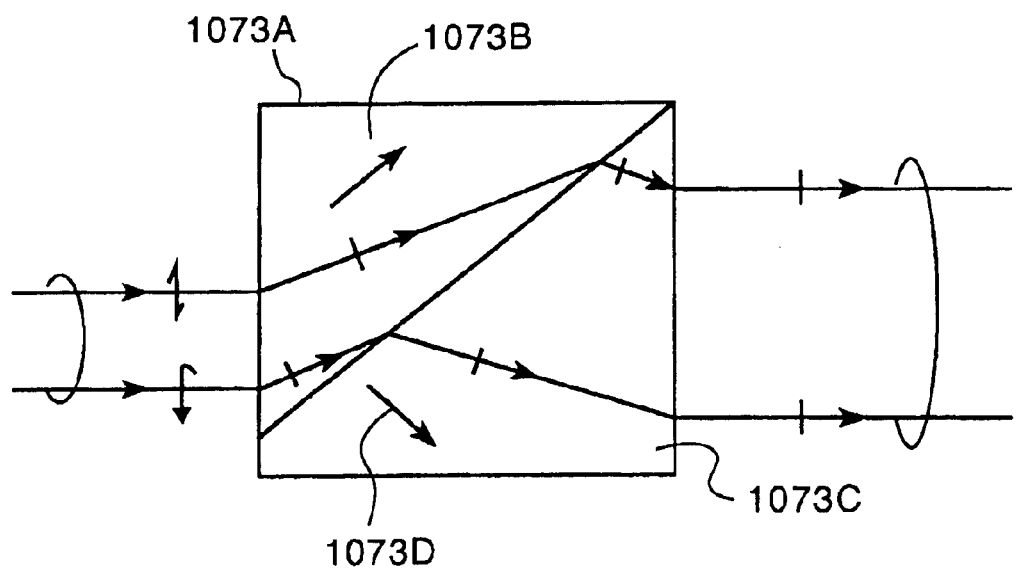

An example of a Galilean afocal lens is shown diagrammatically in FIG. 10b and a prismatic and birefringent anamorphic afocal attachments are shown diagrammatically in FIGS. 10c and 10d, respectively. The Galilean afocal lens shown in FIG. 10b comprises positive and negative lenses 1077A and 1077B, respectively, and illustrates its operation in a demagnifying mode.

A prismatic anamorphic afocal attachment, shown in FIG. 10c, comprises two prisms 1079A and 1079B and also illustrates its operation in a demagnifying mode.

A birefringent anamorphic afocal attachment, shown in FIG. 10d, comprises two birefringent prisms 1073A and 1073C bonded together and illustrates its operation in a magnifying mode. The birefringent prisms may comprise, for example, uniaxial crystals such as calcite and paratellurite. The optic axes for birefringent prisms 1073A and 1073C are shown in FIG. 10d as elements 1073B and 1073D, respectively. Polarization of the incident beam is extraordinary. The path of the incident beam through the birefringent anamorphic afocal attachment and the directions for the optic axes 1073B and 1073D are shown for a system comprising positive uniaxial crystals wherein the ordinary index of refraction is less than the extraordinary index of refraction.

Conditioning of an input beam, such as is done in the embodiment of FIG. 10a is described in greater detail in commonly owned U.S. application Ser. No. 10/207,314 entitled "PASSIVE ZERO SHEAR INTERFEROMETERS" by Henry A. Hill and filed 29 Jun. 2002, the contents of which are incorporated herein by reference.

An advantage of the embodiment of FIG. 10a is that the differential beam shear of the components of the output beam of the angular displacement interferometer at a detector or FOP is substantially reduced compared for example to the differential beam shear in the output beam at the detector or FOP of a HSPMI, for the same reasons as those for the embodiment of FIG. 3.

Another advantage of the embodiment of FIG. 10a is that the differential beam shear of the components of the reference and measurement beams in the HSPMI and in the distance measuring output beam is substantially reduced compared for example to the differential beam shear in the output beam at the detector or FOP of a HSPMI.

Another advantage of the embodiment of FIG. 10a is a reduced number of sources of cyclic errors in the measure phase of an electrical interference signal from the angular displacement interferometer. The number of sources of cyclic errors is reduced as a result of the single pass of each of the angle-measuring beams to the plane mirror measurement object.

Figure 10E:
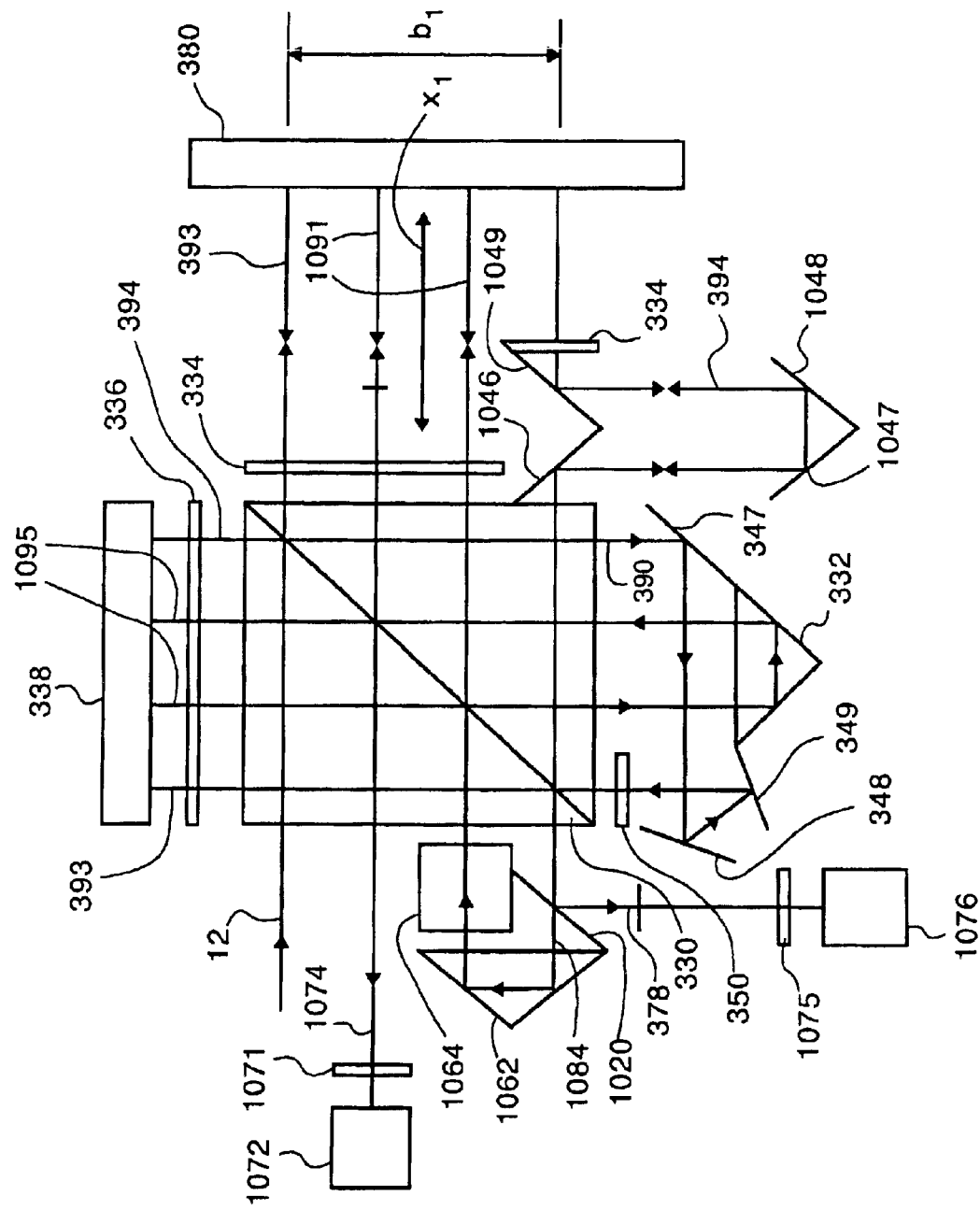

Another embodiment of the invention is shown in FIG. 10e, which is identical that of FIG. 10a except that a delay line formed by mirrors 1046, 1047, 1048, and 1049 introduces additional path length to angle-measuring beam 394' (which corresponds to angle-measuring beam 394 in the embodiment of FIG. 3) during its pass to plane mirror measurement 380 to cause the path length of each angle-measuring beam in the output angle-measuring beam to be equal from the reflection of each from the plane mirror measurement object to the formation of the angle-measuring output beam. As described above, this can substantially eliminate differential shear between the components of the angle-measuring output beam. To minimize depolarization of angle-measuring beam 394' during its reflections from the mirrors in the delay line, an additional quarter wave plate 334' is used to provide space to position the delay line between polarizing beam splitter 330 and quarter wave plate 334'. As a result the beam 394' is linearly polarized either in the plane of FIG. 10e or orthogonal to the plane of FIG. 10e when it reflects from the mirrors of the delay line.

The delay line compensates for the residual differential beam shear that is present in the angle-measuring output beam of the embodiment of FIG. 10a. The residual differential beam shear after the compensation in the fourth embodiment is $</\sim1$ micron.

The compensation of the differential beam shear in the angle-measuring output beam has in addition the consequence that the differential beam shear in the distance-measuring output beam is compensated, i.e. the residual differential beam shear is $</\sim1$ micron.

The optical path in the optical delay line is in gas or preferably in vacuum so that the optical path lengths in glass of the two measurement legs of the angular displacement interferometer remain the same. The length of the optical delay line is chosen to compensate for the differences that are otherwise would be present between the two measurement legs of the angular displacement interferometer following contact of the respective measurement beams with the plane mirror measurement object. The length of a measurement leg for the purposes of determining the optical path length of the optical delay line is the sum of lengths of sections of the measurement leg weighted by 1/n wherein n is the index of refraction of the a respective section. The indices of refraction of sections of the measurement leg may comprise several different values.

In yet further embodiments, the delay line in the embodiment of FIG. 10e may be similarly introduced into the embodiment of FIG. 3 to compensate for the residual differential beam shear in the angle-measuring output beam of the angular displacement interferometer of the embodiment of FIG. 3.

Figure 13:
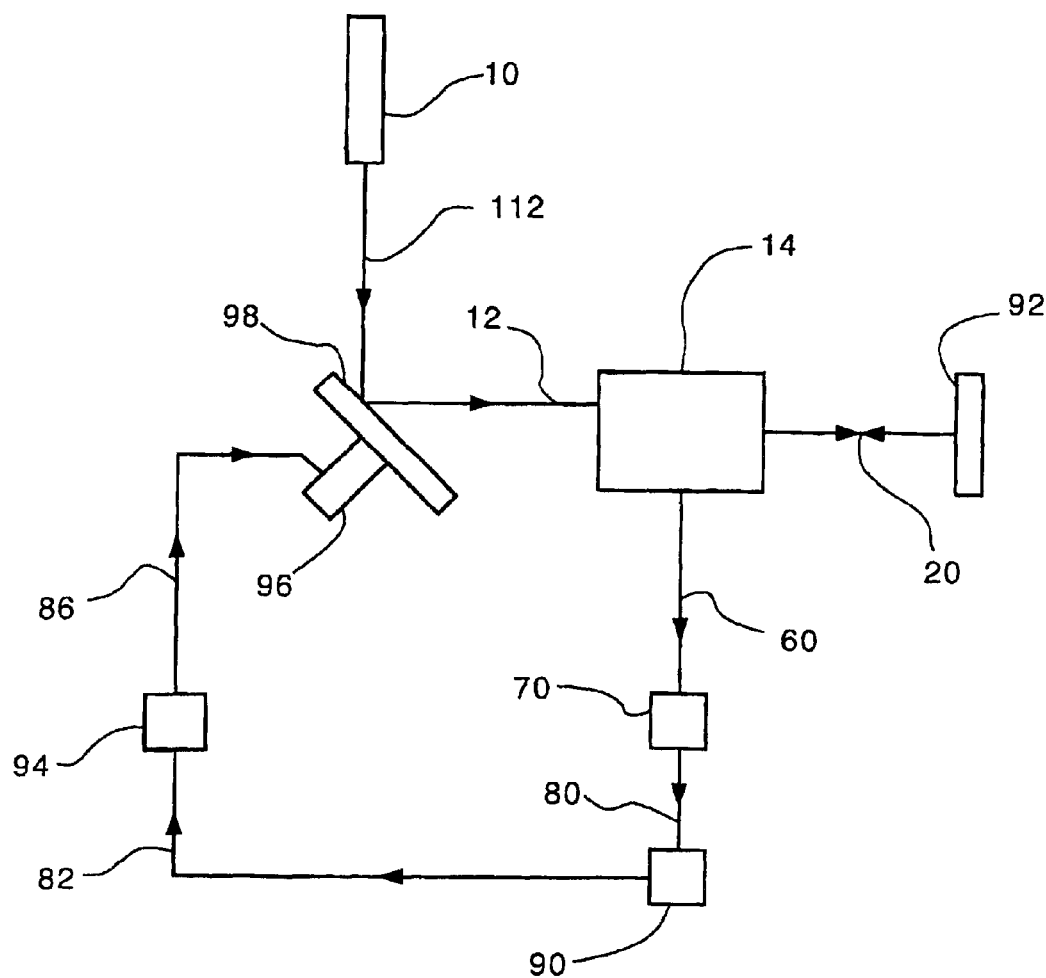
FIG. 13 is a schematic diagram of an interferometry system including dynamic beam steering element positioned to direct an input beam into the interferometer.

FIG. 13 is a diagrammatic view of an interferometer system by which linear and angular displacements of a plane mirror measurement object 92 are measured and monitored. As shown in FIG. 13, the interferometer system comprises an interferometer 14 which may be structured and arranged as any one of the interferometers described herein and a dynamic beam steering element that controls the direction of input beam 12 to interferometer 14.

The purpose of changing the direction of input beam 12 is to eliminate or substantially reduce the effects of non-cyclic errors in the electrical interference signals generated from output beams of interferometer 14. The elimination or substantial reduction of the effects of non-cyclic errors is achieved by the elimination or the substantial reduction of beam shears in interferometer 14 and at the detector 70.

The interferometer system further comprises source 10 that produces beam 112, detector 70, servo controller 94, transducer 96, and electronic processor and computer 90. With each interferometer type, interferometer beams travel to and from mirror 92 generally along an optical path designated as 20 and output beams travel from interferometer 14 to detector 70 along an optical path designated as 60. The description of beam 112 is the same as the description of beam 12 of FIG. 1.

The orientation of the beam steering element 98 is controlled by transducer 96 such that the measurement beams that travel along path 20 are incident on mirror 92 with an angle of incidence of zero degrees. Transducer 96 is controlled by servo control signal 86 from servo controller 94. Servo control signal 86 is derived from servo signal 82 that is generated by electronic processor and computer 90.

The control of dynamic element 98 may be in one of two modes. One mode is a feedback mode wherein the orientation of dynamic element 98 is controlled according to an error signal based for example on measured departures of the angles of incidence of the measurement beams at mirror 92 from zero degrees. The second mode is a feed forward mode wherein control signal 82 is based on measured changes in orientation of mirror 92. The measured changes may be based entirely or in part for example on the changes in orientation of mirror 92 as measured by interferometer 14.

Interferometer systems that include dynamic beam steering elements on the input beam to an interferometer are also described in commonly owned U.S. Pat. Nos. 6,252,667, 6,313,918, and 6,271,923 and in PCT Publication WO 00/66969, the contents of which are all incorporated herein by reference.

The precision to which the direction of measurement beams on path 20 need to be maintained/known is in general not the same as the precision to which changes in the angular orientation of mirror 92 need be measured/known by several orders of magnitude. The change in linear displacement measured by interferometer system 14 is nominally the change in a distance from a point defined by the beam steering element along a line orthogonal to the reflecting surface of mirror 92. A fractional error in the measured linear displacement introduced by a departure $\epsilon$ of the direction of the measurement beams from the orthogonal line will be $(1-\cos^2\epsilon) \cong \epsilon^2$. Thus for fractional errors of 1 ppb and 0.1 ppb for example, the corresponding values of $\epsilon$ need to be $\leq 3.2 \times 10^{-5}$ and $\leq 1.0 \times 10^{-5}$, respectively. Typical ranges of values $\theta$ are of the order of 0.001 radians where $\theta$ is the orientation of the reflecting surface of mirror 92 relative to the fixed reference frame of the lithography tool metrology system. Thus the precision to which $\epsilon$ need be known relative to $\theta$ is 3.2% and 1.0%, respectively. This feature of the present invention considerably relaxes the performance requirements of the control system for the dynamic beam steering element. This is particularly important for a feed forward control system.

Another consequence of the reduced precision required for $\epsilon$ is that the accuracy of a feed back or feed forward control system is easily determined in situ. One example of a procedure for calibration of the control system is to scan the orientation of the beam steering element for a series of fixed orientations of mirror 92 and detect the location where $\epsilon=0$ for each of the fixed orientations of mirror 92 by monitoring the amplitude of the heterodyne or electrical interference signal.

The conversion factor used for converting the measured change in the orthogonal linear displacement to a fixed reference frame of the lithography tool metrology system is $\cos^2\theta$. Typical ranges of values $\theta$ are of the order of 0.001 radians. Thus for fractional errors of 1 ppb and 0.1 ppb in the conversion factor, the corresponding errors in values of $\theta$ need to be $\leq 5 \times 10^{-7}$ and $\leq 5 \times 10^{-8}$, respectively. The information on $\theta$ required for application of the conversion factor is obtained in the present invention from the measured changes in pairs of linear displacements.

Figure 14:
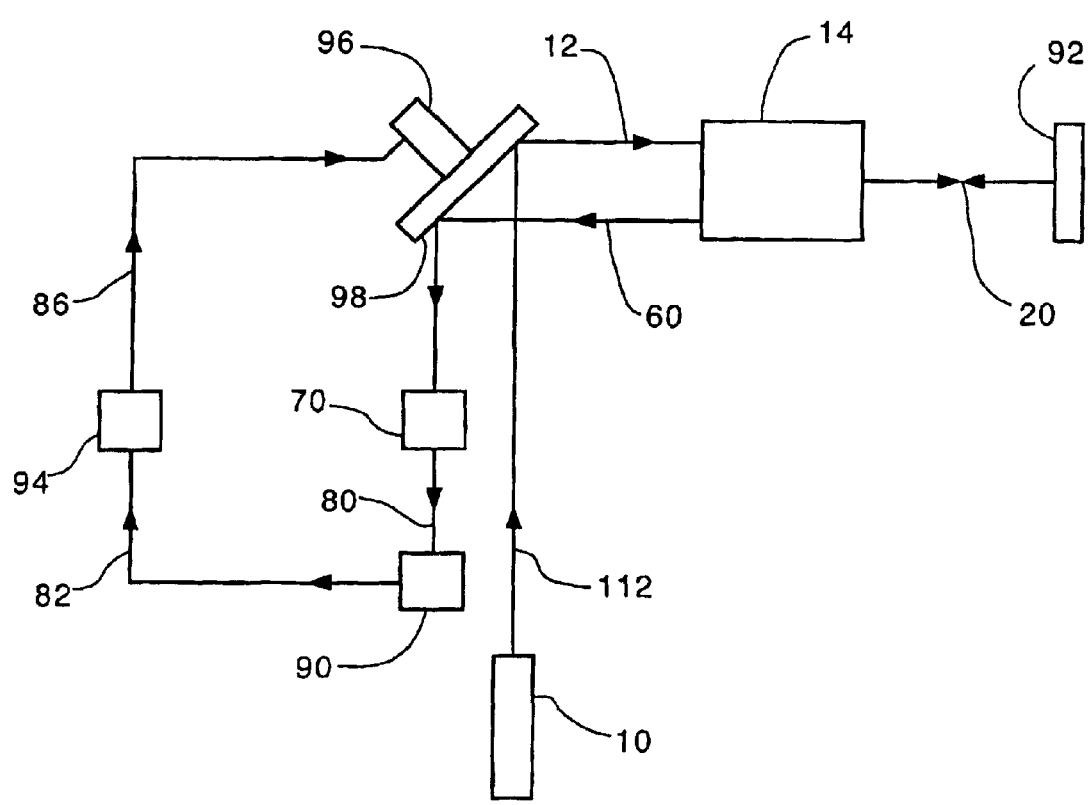
FIG. 14 is a schematic diagram of an interferometry system including dynamic beam steering element positioned to direct an input beam into the interferometer and one or more output beams from the interferometer.

FIG. 14 is a diagrammatic view of an interferometer system by which linear and angular displacements of a plane mirror measurement object 92 are measured and monitored. As shown in FIG. 14, the interferometer system comprises an interferometer 14 which may be structured and arranged as any of the interferometers described herein and a dynamic beam steering element that controls the direction of input beam 12 to interferometer 14 and the direction of output beam 60 to detector 70.

The purpose of changing the direction of input beam 12 and the direction of output beam 60 is to eliminate or substantially reduce the effects of non-cyclic errors in the electrical interference signals generated from output beams of interferometer 14. The elimination or substantial reduction of the effects of non-cyclic errors is achieved by the elimination or the substantial reduction of beam shears in the interferometer and at detector 70 and the elimination or substantial reduction of changes in angle of incidence of beams at detector 70.

The interferometer system further comprises source 10 that produces beam 112, detector 70, servo controller 94, transducer 96, and electronic processor and computer 90. With each interferometer type, interferometer beams travel to and from mirror 92 generally along an optical path designated as 20 and output beams travel from interferometer 14 to detector 70 along an optical path designated as 60. The description of beam 112 is the same as the description of beam 12 of FIG. 1.

The orientation of the beam steering element 98 is controlled by transducer 96 such that the measurement beams that travel along path 20 are incident on mirror 92 with an angle of incidence of zero degrees. Transducer 96 is controlled by servo control signal 86 from servo controller 94. Servo control signal 86 is derived from servo signal 82 that is generated by electronic processor and computer 90.

The description of the interferometer system and dynamic beam steering system shown in FIG. 14 with respect to the errors $\epsilon$ and the conversion factors is the same as the corresponding portion of the description given for the interferometer system and dynamic beam steering system shown in FIG. 13.

We note that in any of the interferometry systems described above, the plane mirror reference object may be integrated into the interferometer assembly. Alternatively, the plane mirror reference object may be part of a second measurement object, such as in a differential plane mirror interferometer. In such embodiments, the interferometer may include additional optics for coupling beams to the reference mirror on the second measurement object.

The interferometry systems described above provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997).

Overlay depends directly on the performance, i.e. accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as cyclic error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 11A:
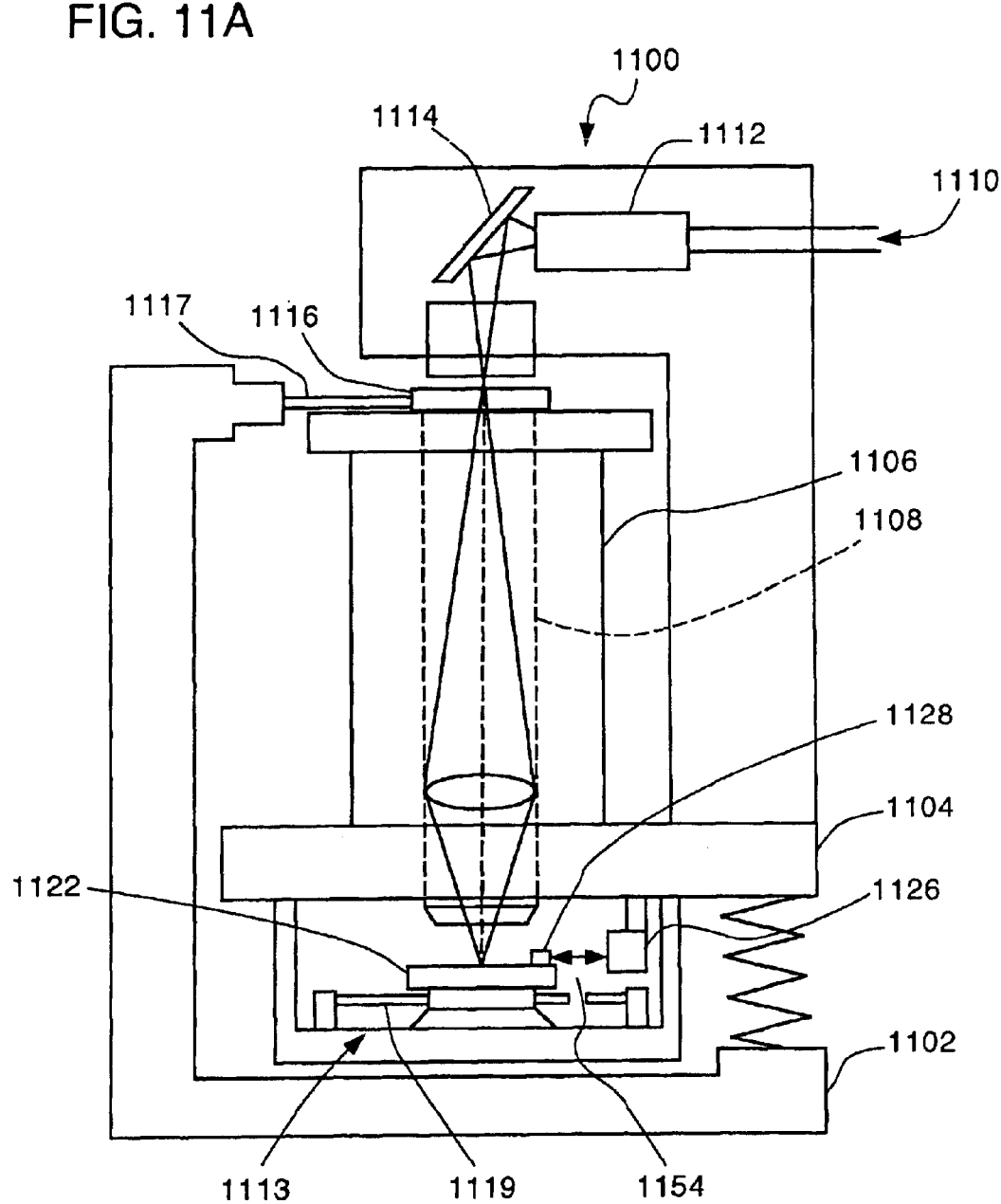
FIG. 11a is a schematic diagram of a lithography system used to make integrated circuits.

An example of a lithography scanner 1100 using an interferometry system 1126 is shown in FIG. 11a. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 11B:
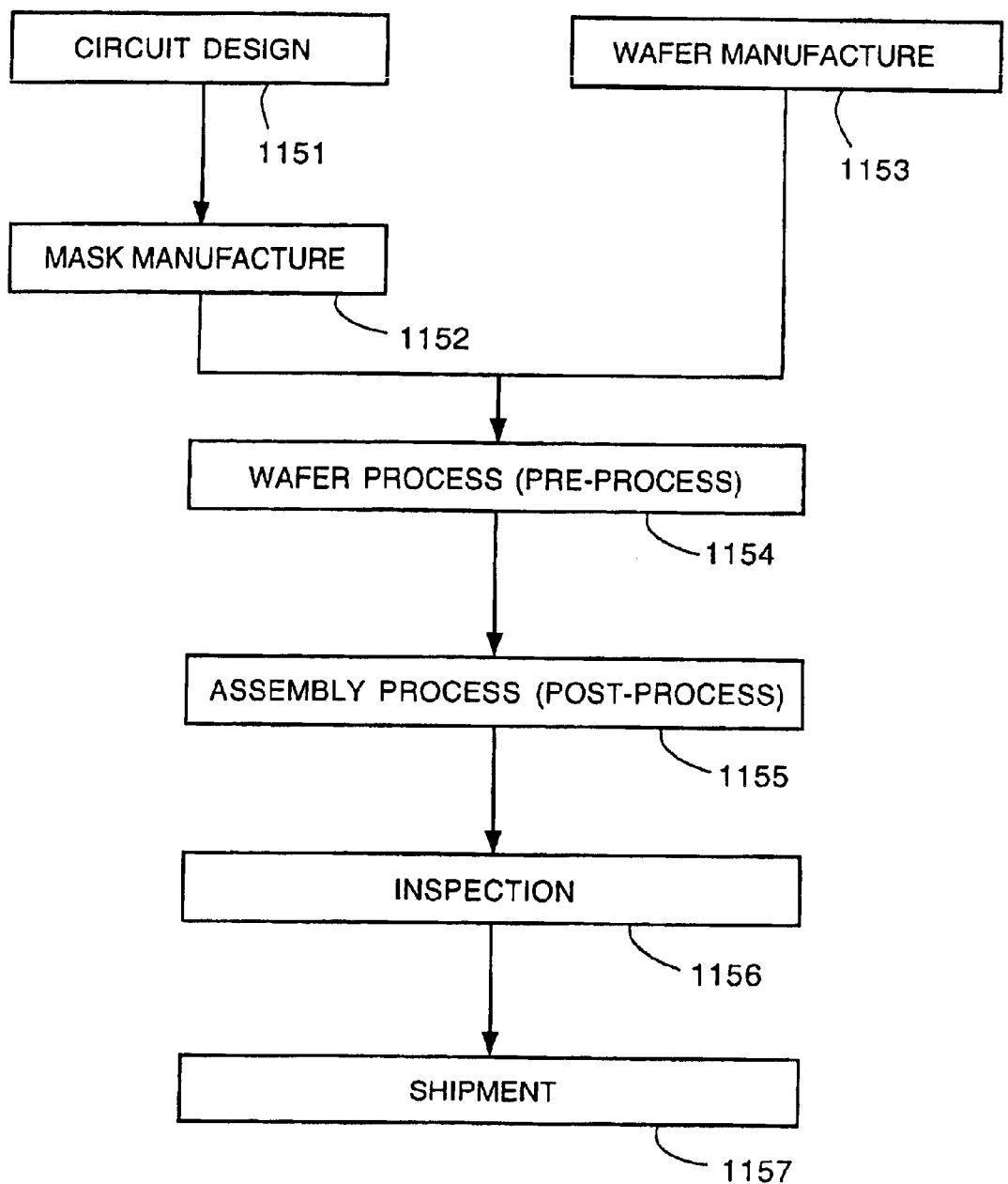
FIGS. 11b–11c are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 11b and 11c. FIG. 11b is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 11C:
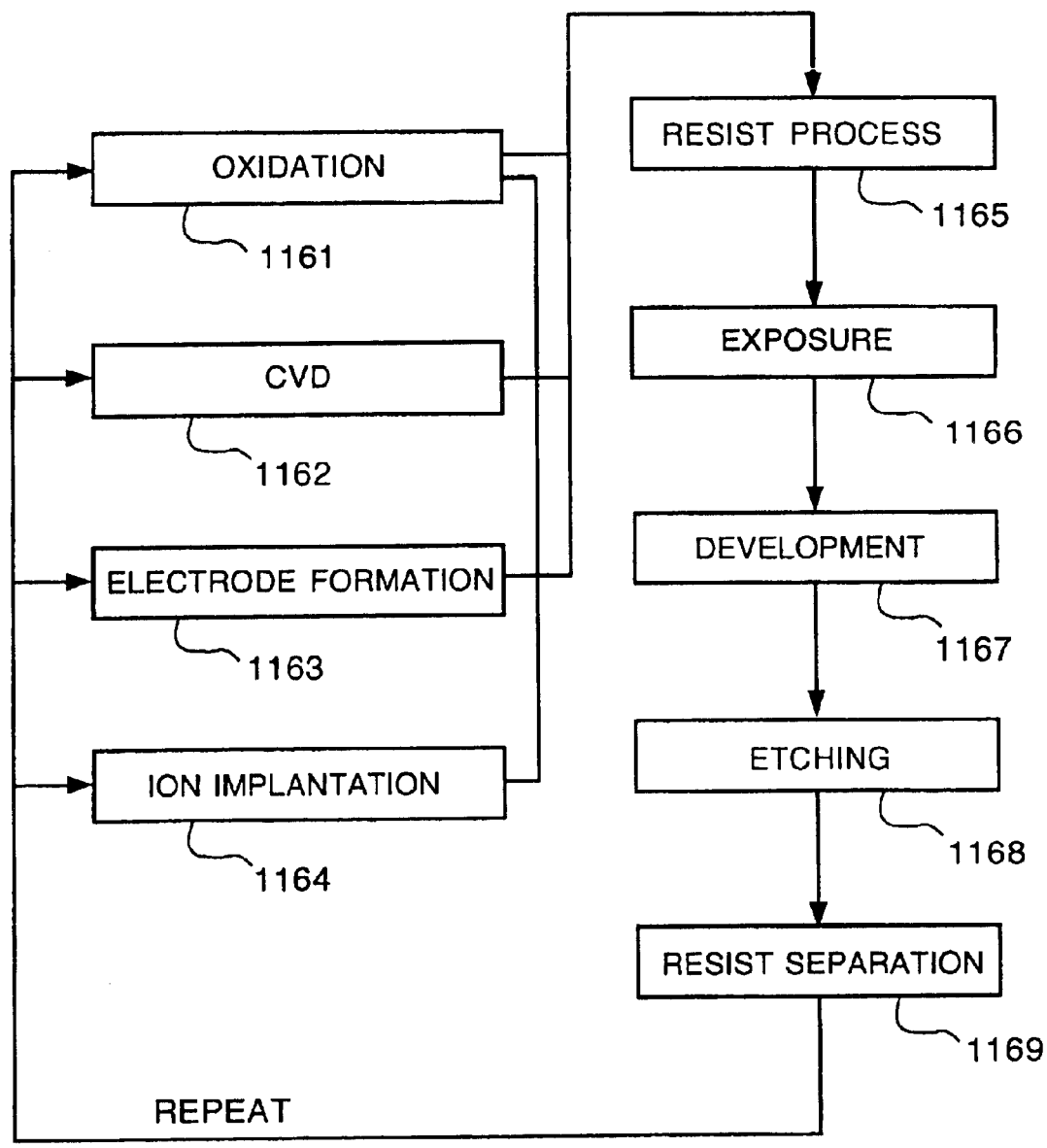

FIG. 11c is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 12:
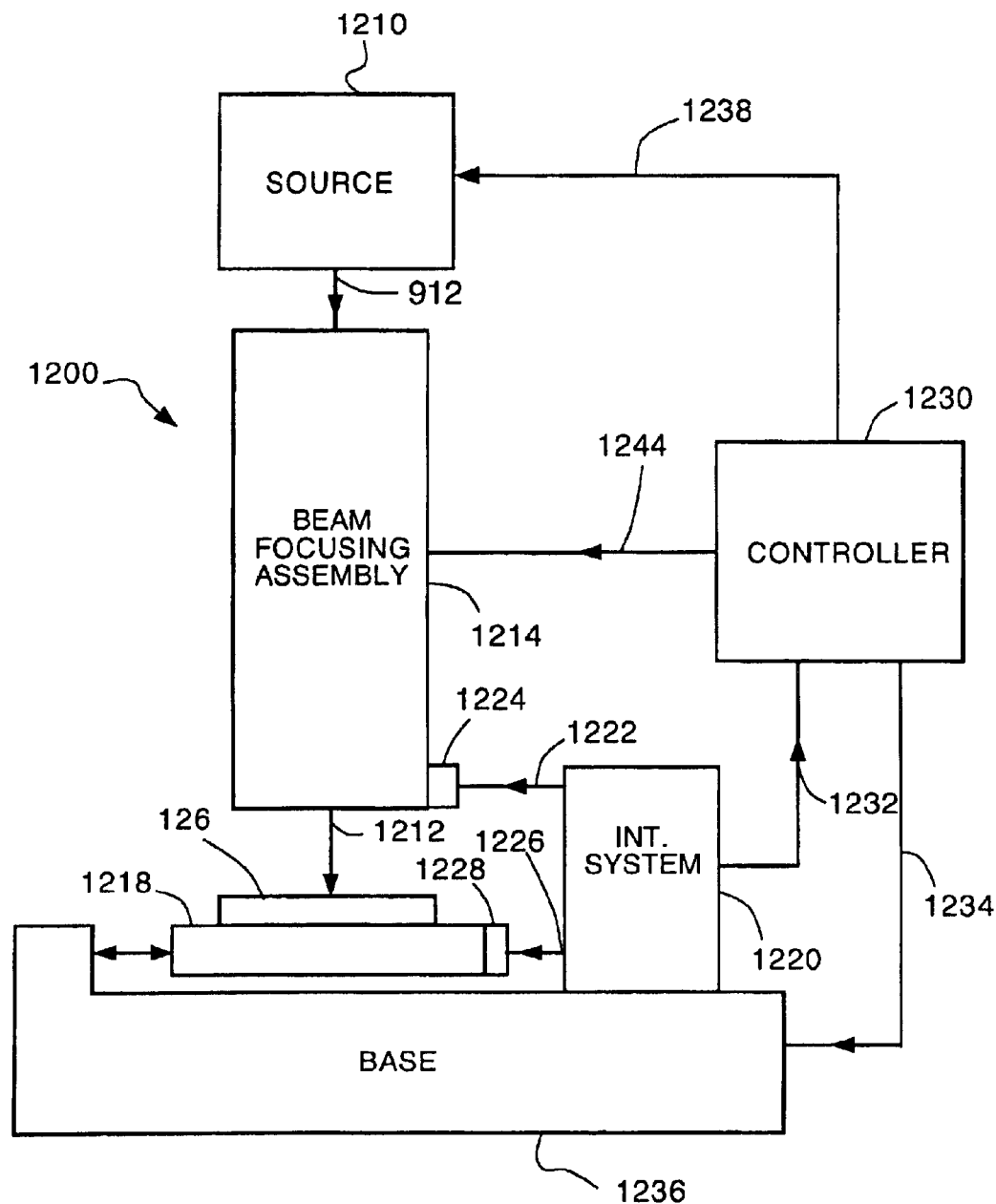
FIG. 12 is a schematic of a beam writing system.

As an example, a schematic of a beam writing system 1200 is shown in FIG. 12. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g. using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention.

What is claimed is:

1. An apparatus comprising:
   a multi-axis interferometer for measuring changes in a position of a measurement object,
   the interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, wherein each angle-measuring beam makes only a single pass to the measurement object before being combined to form the angle-measuring output beam, and
   the interferometer is further configured to direct another set of beams derived from the progenitor input beam along respective paths and then combine them to produce another output beam comprising information about changes in the position of the measurement object.

2. The apparatus of claim 1, wherein the other set of beams comprises a first distance-measuring beam and a second distance-measuring beam and the other output beam is a distance-measuring output beam, and wherein the interferometer directs the first distance-measuring beam to make first and second passes to the measurement object and then combines it with the second distance-measuring beam to produce the distance-measuring output beam.

3. The apparatus of claim 2, wherein the interferometer comprises a non-polarizing beam-splitter positioned to receive the progenitor input beam and separate it into an angle-measuring input beam and a distance-measuring input beam, wherein the first and second angle-measuring beams are derived from the angle-measuring input beam and the first and second distance-measuring beams are derived from the distance-measuring input beam.

4. The apparatus of claim 2, wherein the interferometer is configured to overlap the first angle-measuring beam with the first distance-measuring beam during their first pass to the measurement object.

5. The apparatus of claim 4, wherein the interferometer comprises a non-polarizing beam-splitter positioned to separate the first angle-measuring beam from the first distance-measuring beam after their first pass to the measurement object.

6. The apparatus of claim 2, wherein the interferometer comprises a non-polarizing beam-splitter positioned to receive the angle-measuring output beam and separate a portion of it to define a distance-measuring input beam, wherein the distance-measuring beams are derived from the distance-measuring input beam.

7. The apparatus of claim 6, wherein the interferometer further comprises output fold optics positioned to direct the distance-measuring input beam, the output fold optics comprising an afocal system having a magnification selected to cause the first distance-measuring beam to contact the measurement object at substantially normal incidence for a range of angular orientations of the measurement object.

8. The apparatus of claim 3, wherein the interferometer comprises an angle-measuring optical assembly configured to direct the angle-measuring beams to the measurement object and a distance-measuring optical assembly configured to direct the distance measuring beams, wherein the angle-measuring optical assembly and distance-measuring optical assembly each comprise separate polarizing beam-splitters.

9. The apparatus of claim 8, wherein the distance-measuring optical assembly is configured as a high-stability plane mirror interferometer (HSPMI).

10. The apparatus of claim 2, wherein the interferometer is further configured to direct the first angle-measuring beam to make a pass to a reflective reference object after making the pass to the measurement object and before being combined with the second angle-measuring beam, and direct the second angle-measuring beam to make a pass to the reference object before making the pass to the measurement object.

11. The apparatus of claim 10, wherein the interferometer is further configured to direct the second distance-measuring beam to make first and second passes to the reference object.

12. The apparatus of claim 11, wherein the interferometer comprises:
a polarizing beam-splitter positioned to transmit one of each of the angle-measuring beams and the distance-measuring beams and reflect the other of each of the angle-measuring beams and the distance-measuring beams during each of the passes to the measurement and reference objects, and further positioned to recombine the angle-measuring beams to form the angle-measuring output beam and recombine the distance-measuring beams to form the distance-measuring output beam after the first and second passes; and
a return optical assembly positioned to receive the angle-measuring and distance-measuring beams from the polarizing beam-splitter and redirect them back to the polarizing beam splitter between the first and second passes.

13. The apparatus of claim 12, wherein the reference object comprises a plane mirror.

14. The apparatus of claim 13, wherein the interferometer further comprises the reference object.

15. The apparatus of claim 13, wherein the interferometer further comprises a quarter-wave retarder positioned between the polarizing beam-splitter and the reference object.

16. The apparatus of claim 12, wherein the measurement object comprises a plane mirror.

17. The apparatus of claim 16, wherein the interferometer further comprises a quarter-wave retarder positioned between the polarizing beam-splitter and the measurement object.

18. The apparatus of claim 12, wherein the return optical assembly comprises a half-wave retarder positioned to rotate the polarizations of the angle-measuring beams between the first and second passes.

19. The apparatus of claim 18, wherein the return optical assembly further comprises an odd number of reflective surfaces positioned for the redirecting of the angle-measuring beams back to the polarizing beam-splitter.

20. The apparatus of claim 19, wherein the return optical assembly further comprises a retroreflector positioned for the redirecting of the distance-measuring beams back to the polarizing beam-splitter.

21. The apparatus of claim 12, wherein the interferometer further comprises a non-polarizing beam-splitter positioned to receive the progenitor input beam and separate it into an angle-measuring input beam and a distance-measuring input beam, and wherein the polarizing beam-splitter is positioned to separate the angle-measuring input beam into the first and second angle-measuring beams and separate the distance-measuring input beam into the first and second distance-measuring beams.

22. The apparatus of claim 12, wherein the interferometer is configured to direct the first angle-measuring beam to overlap with the first distance-measuring beam during their first pass to the measurement object and direct the second angle-measuring beam to overlap with the second distance-measuring beam during their first pass to the reference object.

23. The apparatus of claim 22, wherein the polarizing beam-splitter is positioned to separate the progenitor input beam into a pair of overlapping beams comprising the first angle-measuring beam and the first distance-measuring beam and a pair of overlapping beams comprising the second angle-measuring beam and the second distance-measuring beam, and wherein the polarizing beam-splitter is further positioned to recombine the pairs of beams after their respective first passes to the measurement and reference objects to define an intermediate beam.

24. The apparatus of claim 23, wherein the return optical assembly is positioned to receive the intermediate beam and comprises a non-polarizing beam-splitter positioned to separate spatially the angle-measuring beams from the distance-measuring beams.

25. The apparatus of claim 12, wherein the interferometer comprises output fold optics comprising a non-polarizing beam-splitter positioned to receive the angle-measuring output beam and separate a portion of it to define a distance-measuring input beam, wherein the output fold optics are configured to direct the distance-measuring input beam to the polarizing beam-splitter, and wherein the polarizing beam-splitter is positioned to separate the distance-measuring input beam into the distance-measuring beams.

26. The apparatus of claim 25, wherein the output fold optics comprise an afocal system having a magnification selected to cause the first distance-measuring beam to contact the measurement object at substantially normal incidence for a range of angular orientations of the measurement object.

27. The apparatus of claim 19, wherein the odd number of reflective surfaces each comprise a normal in a common plane.

28. The apparatus of claim 27, wherein the odd number of reflective surfaces reflect the angle-measuring beams such that a sum of angles between incident and reflected beams at each of the reflective surfaces is zero or an integer multiple of 360 degrees, each angle measured in a direction from the incident beam to the reflected beam and having a positive value when measured in a counter clockwise direction and a negative value when measured in a clockwise direction.

29. The apparatus of claim 12, wherein the return optical assembly comprises a set of reflective surfaces positioned for the redirecting of the angle-measuring beams back to the polarizing beam-splitter, wherein the set of reflective surfaces reflect the angle-measuring beams such that a sum of angles between incident and reflected beams at each of the reflective surfaces is zero or an integer multiple of 360 degrees, each angle measured in a direction from the incident beam to the reflected beam and having a positive value when measured in a counter clockwise direction and a negative value when measured in a clockwise direction.

30. The apparatus of claim 1, further comprising a light source configured to produce the progenitor input beam and direct it into the multi-axis interferometer, the progenitor input beam comprising two components having an heterodyne frequency splitting, wherein one of each of the angle-measuring beams and the other set of beams is derived from one of the components in the input beam, and the other of each of the angle-measuring beams and the other set of beams is derived from the other of the components in the input beam.

31. The apparatus of claim 30, wherein the components of the input beam have orthogonal polarizations.

32. The apparatus of claim 1, further comprising detectors configured to receive the output beams and generate electrical signals indicative of the changes in the angular orientation of, and the distance to, the measurement object.

33. The apparatus of claim 32, further comprising a polarization analyzer positioned prior to each detector and configured to pass an intermediate polarization to those of the components in each of the output beams.

34. The apparatus of claim 33, further comprising a fiber optic pick-up for coupling each output beam to a corresponding detector after it passes through the corresponding polarization analyzer.

35. The apparatus of claim 12, wherein the interferometer further comprises an optical delay line positioned to reduce differential beam shear in the angle-measuring output beam.

36. The apparatus of claim 35, wherein the optical delay line is positioned to introduce additional path length to the second angle-measuring beam during its return from the measurement object.

37. The apparatus of claim 35, wherein the optical delay line is configured to introduce a difference in path length between orthogonally polarized components of an incident beam.

38. The apparatus of claim 37, wherein the optical delay line is positioned to receive the progenitor input beam and both of the output beams.

39. The apparatus of claim 37, wherein the optical delay line is positioned to receive the progenitor input beam and the distance-measuring output beam and the interferometer comprises a second optical delay line positioned to receive the second the angle-measuring beam during its pass to the measurement object.

40. The apparatus of claim of 1, wherein the interferometer further comprises an optical delay block positioned to introduce additional path length to the second angle-measuring beam during its return from the measurement object to reduce differential beam shear in the angle-measuring output beam.

41. The apparatus of claim 2, wherein the first-mentioned angle-measuring output beam comprises information about the angular orientation of the measurement object with respect to a first rotation axis.

42. The apparatus of claim 41, wherein the interferometer is further configured to direct a third angle-measuring beam derived from the progenitor input beam to make a pass to the measurement object, direct a fourth angle-measuring beam derived from the progenitor input beam to make a pass to the measurement object, and then combine the third and fourth angle-measuring beams to produce a second angle-measuring output beam comprising information about the angular orientation of the measurement object with respect to a second rotation axis different from the first rotation axis.

43. The apparatus of claim 42, wherein the interferometer is configured to overlap the first and third angle-measuring beams during their pass to the measurement object.

44. The apparatus of claim 42, wherein the second rotation axis is orthogonal to the first rotation axis.

45. An apparatus comprising:
a multi-axis interferometer for measuring changes in an angular orientation of, and distance to, a measurement object,
the interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, and
the interferometer is further configured to direct another set of beams derived from the progenitor input beam along respective paths and then combine them to produce another output beam comprising information about changes in the position of the measurement object,
wherein the interferometer comprises a non-polarizing beam-splitter positioned to receive the progenitor input beam and separate it into an angle-measuring input beam and another input beam, wherein the first and second angle-measuring beams are derived from the angle-measuring input beam and the other set of beams are derived from the other input beam.

46. An apparatus comprising:
a multi-axis interferometer for measuring changes in a position of a measurement object;
the interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, and
the interferometer is further configured to direct another set of beams derived from the progenitor input beam along respective paths and then combine them to produce another output beam comprising information about changes in the position of the measurement object,
wherein during operation the first angle-measuring beam overlaps with a first one of the other set of beams during its first pass to the measurement object.

47. An apparatus comprising:
a multi-axis interferometer for measuring changes in a position of a measurement object;
the interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, and the interferometer is further configured to direct a first distance-measuring beam derived from the progenitor input beam to make first and second passes to the measurement object and then combine the first distance-measuring beam with a second-distance measuring beam derived from the progenitor input beam to produce a distance-measuring output beam, wherein the interferometer comprises a non-polarizing beam-splitter positioned to receive the angle-measuring output beam and separate a portion of it to define a distance-measuring input beam, wherein the distance-measuring beams are derived from the distance-measuring input beam.

48. The apparatus of claim 47, wherein the interferometer further comprises fold optics positioned to direct the distance-measuring input beam, the fold optics comprising an afocal system having a magnification selected to cause the first distance-measuring beam portion to contact the measurement object at substantially normal incidence for a range of angular orientations of the measurement object.

49. An apparatus comprising:
a multi-axis interferometer for measuring changes in a position of a measurement object;
the interferometer is configured to receive a progenitor input beam, direct a first angle-measuring beam derived from the progenitor input beam to make a pass to a first point on the measurement object, direct a second angle-measuring beam derived from the progenitor input beam to make a pass to a second point on the measurement object, and then combine the angle-measuring beams to produce an angle-measuring output beam, and
the interferometer is further configured to direct another set of beams derived from the progenitor input beam along respective paths and then combine them to produce another output beam comprising information about changes in the position of the measurement object,
wherein the interferometer comprises a polarizing beam-splitter positioned to combine the first angle-measuring beam with the second angle-measuring beam after the first angle-measuring beam makes its pass to the measurement object but before the second angle-measuring beam makes its pass to the measurement object, the combined beams defining an intermediate beam, and
wherein the interferometer further comprises a return optical assembly positioned to receive the intermediate beam and direct it back to the polarizing beam-splitter, the return optical assembly comprises a set of reflective surfaces positioned to reflect the intermediate beam an odd number of times in a plane defined by the incidence of the angle-measuring beams on the measurement object, and wherein the return optical assembly further comprise a half-wave plate configured rotate the polarization of each angle-measuring beam in the intermediate beam.

50. A method comprising:
directing a first angle-measuring derived from a progenitor input beam to make a pass to a first point on a measurement object;
directing a second angle-measuring beam derived from the progenitor input beam to make a pass to a second point on the measurement object;
combining the angle-measuring beams after their passes to the measurement object to produce an angle-measuring output beam, wherein each angle-measuring beam makes only a single pass to the measurement object;
directing another set of beams derived from the progenitor input beam along respective paths; and
combining the other set of beams to produce another output beam comprising information about changes in the position of the measurement object.

51. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the apparatus of claim 1 for monitoring the position of the wafer relative to the imaged radiation.

52. A lithography system for use in fabricating integrated circuits on a wafer, the system comprising:
a stage for supporting the wafer; and
an illumination system including a radiation source, a mask, a positioning system, a lens assembly, and the apparatus of claim 1,
wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

53. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
the apparatus of claim 1 for monitoring the position of the stage relative to the beam directing assembly.

54. A lithography method for use in fabricating integrated circuits on a wafer, the method comprising:
supporting the wafer on a moveable stage;
imaging spatially patterned radiation onto the wafer;
adjusting the position of the stage; and
monitoring the position of the stage using the method of claim 50.

55. A lithography method for use in the fabrication of integrated circuits comprising:
directing input radiation through a mask to produce spatially patterned radiation;
positioning the mask relative to the input radiation;
monitoring the position of the mask relative to the input radiation using the method of claim 50; and
imaging the spatially patterned radiation onto a wafer.

56. A lithography method for fabricating integrated circuits on a wafer comprising:
positioning a first component of a lithography system relative to a second component of a lithography system to expose the wafer to spatially patterned radiation; and
monitoring the position of the first component relative to the second component using the method of claim 50.

57. A method for fabricating integrated circuits, the method comprising the lithography method of claim 54.

58. A method for fabricating integrated circuits, the method comprising the lithography method of claim 55.

59. A method for fabricating integrated circuits, the method comprising the lithography method of claim 56.

60. A method for fabricating integrated circuits, the method comprising using the lithography apparatus of claim 51.

61. A method for fabricating integrated circuits, the method comprising using the lithography apparatus of claim 52.

62. A method for fabricating a lithography mask, the method comprising:
  directing a write beam to a substrate to pattern the substrate;
  positioning the substrate relative to the write beam; and
  monitoring the position of the substrate relative to the write beam using the interferometry method of claim 50.

* * * * *